(12) United States Patent
Zhang et al.

(10) Patent No.: US 11,870,238 B2
(45) Date of Patent: Jan. 9, 2024

(54) PROTECTION APPARATUS AND PROTECTION METHOD FOR PHOTOVOLTAIC POWER GENERATION SYSTEM

(71) Applicant: Huawei Digital Power Technologies Co., Ltd., Shenzhen (CN)

(72) Inventors: Xiufeng Zhang, Dongguan (CN); Yanzhong Zhang, Shanghai (CN)

(73) Assignee: Huawei Digital Power Technologies Co., Ltd., Shenzhen (CN)

( * ) Notice: Subject to any disclaimer, the term of this patent is extended or adjusted under 35 U.S.C. 154(b) by 90 days.

(21) Appl. No.: 17/535,375

(22) Filed: Nov. 24, 2021

(65) Prior Publication Data

US 2022/0085596 A1 Mar. 17, 2022

Related U.S. Application Data

(63) Continuation of application No. PCT/CN2021/081165, filed on Mar. 16, 2021.

(30) Foreign Application Priority Data

Apr. 13, 2020 (WO) ................ PCT/CN2020/084500

(51) Int. Cl.
*H02H 3/087* (2006.01)
*H02S 40/32* (2014.01)
(Continued)

(52) U.S. Cl.
CPC ............. *H02H 3/087* (2013.01); *H02H 3/18* (2013.01); *H02S 40/32* (2014.12); *H02S 40/36* (2014.12)

(58) Field of Classification Search
CPC ............ H02H 3/087; H02H 3/18; H02H 7/20; H02H 7/26; H02J 1/10; H02J 2300/26;
(Continued)

(56) References Cited

U.S. PATENT DOCUMENTS 10,084,303 B2 * 9/2018 Schulze ................ H02S 40/32
2011/0032099 A1 2/2011 Giesler
(Continued)

FOREIGN PATENT DOCUMENTS

CN 101939660 A 1/2011
CN 103140765 A 6/2013
(Continued)

OTHER PUBLICATIONS

Xuejun, "Principles of Relay Protection (2nd Edition) ," China Electric Power Press, Total 8 pages (Mar. 3, 2007). With an English abstract.

*Primary Examiner* — Jared Fureman
*Assistant Examiner* — Nicolas Bellido
(74) *Attorney, Agent, or Firm* — Leydig, Voit & Mayer, Ltd.

(57) ABSTRACT

A protection apparatus includes an interface, a protection switch, a direct current bus, and a controller. The apparatus is connected to at least two photovoltaic units via the interface, the at least two photovoltaic units are coupled to the direct current bus inside the apparatus to form at least two branches, and each branch is connected to at least one photovoltaic unit. The protection switch is configured to disconnect all or some of the photovoltaic units from the direct current bus, to enable a maximum of three photovoltaic units to be directly connected in parallel. According to the apparatus, a photovoltaic unit and a line are protected with a low power loss when a photovoltaic power generation system is faulty.

33 Claims, 18 Drawing Sheets

(51) Int. Cl.
*H02S 40/36* (2014.01)
*H02H 3/18* (2006.01)

(58) Field of Classification Search
CPC .. H02J 7/35; H02S 40/32; H02S 40/34; H02S 40/36; Y02E 10/56
See application file for complete search history.

(56) References Cited

U.S. PATENT DOCUMENTS

| | | | |
|---|---|---|---|
| 2012/0126626 A1* | 5/2012 | Falk | H02J 1/10 307/80 |
| 2013/0088086 A1 | 4/2013 | Coors et al. | |
| 2013/0222951 A1 | 8/2013 | Zhu et al. | |
| 2013/0241297 A1* | 9/2013 | Falk | H02J 3/381 307/80 |
| 2014/0253138 A1* | 9/2014 | Ishii | H02H 3/16 324/509 |
| 2015/0280423 A1* | 10/2015 | Bremicker | H02J 7/35 307/71 |
| 2017/0229856 A1 | 8/2017 | Schulze | |
| 2019/0089148 A1 | 3/2019 | Hopf | |
| 2019/0229673 A1* | 7/2019 | Liu | H01L 31/02021 |
| 2022/0368126 A1* | 11/2022 | Zhang | H02H 7/268 |

FOREIGN PATENT DOCUMENTS

| | | |
|---|---|---|
| CN | 103151757 A | 6/2013 |
| CN | 104038151 A | 9/2014 |
| CN | 104158154 A | 11/2014 |
| CN | 204045601 U | 12/2014 |
| CN | 104409294 A | 3/2015 |
| CN | 104465253 A | 3/2015 |
| CN | 104919671 A | 9/2015 |
| CN | 104934927 A | 9/2015 |
| CN | 104953535 A | 9/2015 |
| CN | 204652310 U | 9/2015 |
| CN | 205160094 U | 4/2016 |
| CN | 105827179 A | 8/2016 |
| CN | 109510450 A | 3/2019 |
| CN | 110224381 A | 9/2019 |
| CN | 110729714 A | 1/2020 |
| CN | 210053200 U | 2/2020 |
| EP | 3893349 A1 | 10/2021 |
| JP | 2015211606 A | 11/2015 |
| WO | 2012046331 A1 | 4/2012 |
| WO | 2013075291 A1 | 5/2013 |
| WO | 2013098916 A1 | 7/2013 |

* cited by examiner

PROTECTION APPARATUS AND PROTECTION METHOD FOR PHOTOVOLTAIC POWER GENERATION SYSTEM

CROSS-REFERENCE TO RELATED APPLICATIONS

This application is a continuation of International Application No. PCT/CN2021/081165, filed on Mar. 16, 2021, which claims priority to International Application No. PCT/CN2020/084500, filed on Apr. 13, 2020. The disclosures of the aforementioned applications are hereby incorporated by reference in their entireties.

TECHNICAL FIELD

This application relates to the field of photovoltaic power generation technologies, and in particular, to a protection apparatus for a photovoltaic power generation system, a short circuit protection method, and a photovoltaic power generation system.

BACKGROUND

Photovoltaic power generation is a technology that uses a photovoltaic effect of a semiconductor interface to convert light energy into electric energy. A photovoltaic power generation system may usually include a photovoltaic unit, an inverter, an alternating current power distribution device, and the like. To obtain a relatively high output voltage or output current, the photovoltaic unit usually formed by connecting a plurality of photovoltaic components in a specific serial and/or parallel connection manner. The photovoltaic unit is connected to a component with an independent MPPT (maximum power point tracking) function, to improve power generation efficiency of the photovoltaic power generation system.

Currently, to improve a direct current ratio of the photovoltaic power generation system (a ratio of power of the photovoltaic unit to input power of the inverter), each MPPT component is usually connected to at least two photovoltaic units. In an example in which a photovoltaic unit or a line in which a photovoltaic unit is located is short circuited, a short-circuit current is a sum of output currents of other connected photovoltaic units. When there is only one other connected photovoltaic unit, the photovoltaic unit and the line can tolerate this short-circuit current because the short-circuit current is relatively small. However, when there are two or more connected photovoltaic units, the short-circuit current is relatively large. To protect the photovoltaic unit and the line, fuses or a fuse may be connected to a positive output end and/or a negative output end of the photovoltaic unit in series, so that the fuse blows to protect the photovoltaic unit and the line.

However, because a fuse current of the fuse is usually relatively high, and an output current of each photovoltaic unit is relatively low, a sum of short-circuit currents of a plurality of photovoltaic units can hardly reach the fuse current of the fuse. Consequently, the fuse cannot effectively protect the photovoltaic unit and the line. In addition, a resistance of the fuse is relatively large, and this may cause a relatively large power loss in the photovoltaic power generation system.

SUMMARY

This application provides a protection apparatus and a protection method for a photovoltaic power generation system and a photovoltaic power generation system, to effectively protect a photovoltaic unit and a line with a low power loss when the photovoltaic power generation system is faulty.

According to a first aspect, an embodiment of this application provides a protection apparatus for a photovoltaic power generation system. The apparatus is applied to the photovoltaic power generation system, and the apparatus includes an interface, a protection switch, a direct current bus, and a controller. The apparatus is connected to at least two photovoltaic units via the interface, the at least two photovoltaic units are connected to the direct current bus in parallel inside the apparatus to form at least two branches, and each branch is connected to at least one photovoltaic unit. The protection switch is configured to disconnect all or some of the photovoltaic units from the direct current bus, to enable a maximum of three photovoltaic units to be directly connected in parallel. When detecting, based on a parameter detection value of the branch or a parameter detection value of the direct current bus, that the photovoltaic power generation system is faulty, the controller controls the protection switch to be open.

When the protection switch of the apparatus is open, the maximum of three photovoltaic units are directly connected in parallel. Therefore, when one photovoltaic unit can tolerate output currents of two photovoltaic units, when a photovoltaic unit is faulty, a maximum of two normal photovoltaic units output currents to the photovoltaic unit. In this case, the currents fall within a tolerable range of the faulty photovoltaic unit, thereby protecting a photovoltaic component and a line from damage. In addition, because only the protection switch is added to a circuit, and the protection switch has a smaller resistance than a fuse, a loss rate and a loss of the photovoltaic system are reduced. In addition, because the fuse is no longer used, a Y harness originally used for the built-in fuse may be disposed on a photovoltaic unit side instead of being disposed below an inverter or a direct current combiner box of the photovoltaic power generation system, so that cable costs are further reduced.

With reference to the first aspect, in a possible implementation, the parameter detection value is a reverse current value, and the controller is specifically configured to: when a reverse current value of a branch is greater than a first current value, detect that the photovoltaic power generation system is faulty.

When a branch has a relatively large reverse current, it indicates that a direct current output by another branch flows backward to the branch, and therefore it may be detected that a short-circuit fault occurs in the branch.

With reference to the first aspect, in a first possible implementation, the apparatus is connected to at least three photovoltaic units via the interface, a maximum of two photovoltaic units are directly connected to the direct current bus in parallel, and each other photovoltaic unit and at least one protection switch are connected in series and are then connected to the direct current bus in parallel.

In some embodiments, a photovoltaic unit or a line can tolerate an output current of only one photovoltaic unit. When a maximum of two photovoltaic units are directly connected to the direct current bus in parallel, if a short-circuit fault occurs in a photovoltaic unit, a maximum of one normal photovoltaic unit outputs a short-circuit current to the photovoltaic unit, and other photovoltaic units may be directly disconnected. In this case, the short-circuit current falls within a tolerable range of the faulty photovoltaic unit, thereby protecting a photovoltaic component and a line from damage.

With reference to the first aspect, in a second possible implementation, the apparatus is connected to at least three photovoltaic units via the interface, the maximum of three photovoltaic units are directly connected to the direct current bus in parallel, and each other photovoltaic unit and at least one protection switch are connected in series and are then connected to the direct current bus in parallel.

In some embodiments, a photovoltaic unit or a line can tolerate output currents of two photovoltaic units. Therefore, when the maximum of three photovoltaic units are directly connected to the direct current bus in parallel, if a short-circuit fault occurs in a photovoltaic unit, a maximum of two normal photovoltaic units output short-circuit currents to the photovoltaic unit, and other photovoltaic units may be directly disconnected. In this case, the short-circuit currents fall within a tolerable range of the faulty photovoltaic unit, thereby protecting a photovoltaic component and a line from damage.

With reference to the first aspect, in a third possible implementation, the apparatus is connected to three photovoltaic units via the interface, two photovoltaic units are directly connected to the direct current bus in parallel, and the other one photovoltaic unit and at least one protection switch are connected in series and are then connected to the direct current bus in parallel. When a short-circuit fault occurs, the controller can control the protection switch to be open, thereby protecting a photovoltaic unit and a line in the photovoltaic system.

With reference to the first aspect, in a fourth possible implementation, the apparatus is connected to three photovoltaic units via the interface, two photovoltaic units and at least one protection switch are separately connected in series and are then connected to the direct current bus in parallel, and the other one photovoltaic unit is directly connected to the direct current bus in parallel. When a short-circuit fault occurs, the controller can control the protection switch to be open, so that a current flowing to a photovoltaic unit in which a short-circuit fault occurs is zero, thereby protecting a photovoltaic unit and a line in the photovoltaic system.

With reference to the first aspect, in a fifth possible implementation, the apparatus is connected to four photovoltaic units via the interface, two photovoltaic units are first connected in parallel, the two photovoltaic units connected in parallel and at least one protection switch are then connected in series and are then connected to the direct current bus in parallel, and the other two photovoltaic units are directly connected to the direct current bus in parallel. When a short-circuit fault occurs, the controller can control the protection switch to be open, thereby protecting a photovoltaic unit and a line in the photovoltaic system.

With reference to the first aspect, in a sixth possible implementation, the apparatus is connected to four photovoltaic units via the interface, two photovoltaic units are directly connected in parallel, the other two photovoltaic units and at least one protection switch are separately connected in series, and the other two photovoltaic units and the at least one protection switch separately connected in series and the two photovoltaic units are then connected in parallel before being connected to the direct current bus in parallel. When a short-circuit fault occurs, the controller can control the protection switch to be open, thereby protecting a photovoltaic unit and a line in the photovoltaic system.

With reference to the first aspect, in a seventh possible implementation, the apparatus is connected to four photovoltaic units via the interface, one photovoltaic unit and at least one protection switch are connected in series and are then connected to the direct current bus in parallel, and the other three photovoltaic units are directly connected to the direct current bus in parallel. In this case, a photovoltaic unit or a line can tolerate output currents of two photovoltaic units, and when a short-circuit fault occurs, the controller can control the protection switch to be open, thereby protecting a photovoltaic unit and a line in the photovoltaic system.

With reference to the first aspect, in an eighth possible implementation, the apparatus is connected to four photovoltaic units via the interface, three photovoltaic units are first connected in parallel, the three photovoltaic units connected in parallel and at least one protection switch are then connected in series and are then connected to the direct current bus in parallel, and the other one photovoltaic unit is directly connected to the direct current bus in parallel. In this case, a photovoltaic unit or a line can tolerate output currents of two photovoltaic units, and when a short-circuit fault occurs, the controller can control the protection switch to be open, thereby protecting a photovoltaic unit and a line in the photovoltaic system.

With reference to the first aspect, in a ninth possible implementation, when the photovoltaic unit is connected to one protection switch in series, the protection switch is connected to a positive output end or a negative output end of the photovoltaic unit in series. Controlling the protection switch to be open can control a line in which a corresponding photovoltaic unit is located to be disconnected.

With reference to the first aspect, in a tenth possible implementation, when the photovoltaic unit is connected to two protection switches in series, the two protection switches are separately connected to a positive output end and a negative output end of the photovoltaic unit in series. Redundantly disposing the protection switch improves a fault tolerance capability of the system and can completely cut off a connection between a short-circuit photovoltaic unit and the system to facilitate maintenance.

With reference to the first aspect, in an eleventh possible implementation, when a plurality of photovoltaic units are first connected in parallel and are then connected to one protection switch in series, positive output ends of the plurality of photovoltaic units are connected in parallel and are then connected to one protection switch in series, or negative output ends of the plurality of photovoltaic units are connected in parallel and are then connected to another protection switch in series. Controlling the protection switch to be open can control a line in which a corresponding photovoltaic unit is located to be disconnected.

With reference to the first aspect, in a twelfth possible implementation, when a plurality of photovoltaic units are first connected in parallel and are then connected to two protection switches in series, positive output ends of the plurality of photovoltaic units are connected in parallel and are then connected to one protection switch in series, and negative output ends of the plurality of photovoltaic units are connected in parallel and are then connected to the other protection switch in series. Redundantly disposing the protection switch improves a fault tolerance capability of the system.

With reference to the first aspect, in a thirteenth possible implementation, that the controller is configured to: when a reverse current of a branch is greater than the first current value, control the protection switch to be open specifically includes: when an absolute value of a current of a branch is greater than an absolute value of a current of the direct current bus, detecting that a reverse current of a branch is greater than the first current value, and controlling the protection switch to be open.

A reason is: When there is no short-circuit fault, output currents of all photovoltaic units are aggregated into the direct current bus, and therefore the absolute value of the current of the direct current bus is greater than an absolute value of a current of any branch. When a short-circuit fault occurs in a photovoltaic unit, output currents of other normal photovoltaic units flow to the short-circuit photovoltaic unit. In this case, the absolute value of the current of the direct current bus is less than an absolute value of a current of any branch.

With reference to the first aspect, in a fourteenth possible implementation, the apparatus further includes a first current sensor and a second current sensor; the first current sensor is configured to: obtain the absolute value of the current of the direct current bus, and send the absolute value to the controller; and the second current sensor is configured to: obtain a preset absolute value of a current of a branch, and send the absolute value to the controller.

The controller compares an absolute value of a current of a branch with the absolute value of the current of the direct current bus to detect whether a short-circuit fault occurs in a photovoltaic unit or a line.

With reference to the first aspect, in a fifteenth possible implementation, the apparatus further includes a power circuit; and the power circuit is a direct current/direct current DC/DC conversion circuit or a direct current/alternating current DC/AC conversion circuit.

With reference to the first aspect, in a sixteenth possible implementation, the apparatus further includes a first voltage sensor and a direct current switch; the direct current bus is connected to an input end of the power circuit via the direct current switch; and the first voltage sensor is configured to: obtain an absolute value of a voltage of the direct current bus, and send the absolute value to the controller.

With reference to the first aspect, in a seventeenth possible implementation, that the controller is configured to: when a reverse current of a branch is greater than the first current value, control the protection switch to be open specifically includes: when a current direction of a branch is opposite to a preset current direction, detecting that a reverse current of a branch is greater than the first current value, and controlling the protection switch to be open.

A reason is: When a short-circuit fault occurs in a photovoltaic unit, currents of branches in which other normal photovoltaic units are located flow to a branch in which the faulty photovoltaic unit is located, and in this case, a current detection direction of the branch in which the faulty photovoltaic unit is located is opposite to a preset direction when the photovoltaic unit is normal. When the branch in which the photovoltaic unit is located is normal and a short-circuit fault occurs in another branch, the branch in which the photovoltaic unit is located outputs a current to the branch in which a short-circuit fault occurs, and in this case, a current detection direction of the another branch is opposite to a preset current direction.

With reference to the first aspect, in an eighteenth possible implementation, the apparatus further includes a third current sensor and a fourth current sensor; the third current sensor is configured to: obtain a current detection direction of a first detection point, and send the current detection direction to the controller, where the first detection point is located in any branch; and the fourth current sensor is configured to: obtain a current detection direction of a second detection point, and send the current detection direction to the controller, where all branches other than the branch in which the first detection point is located are aggregated at the second detection point.

With reference to the first aspect, in a nineteenth possible implementation, the controller is specifically configured to: when the current detection direction of the first detection point is opposite to a preset current direction of the first detection point or the current detection direction of the second detection point is opposite to a preset current direction of the second detection point, control the protection switch to be open.

With reference to the first aspect, in a twentieth possible implementation, the protection apparatus further includes a power circuit; and the power circuit is a direct current/direct current DC/DC conversion circuit or a direct current/alternating current (DC/AC) conversion circuit.

With reference to the first aspect, in a twenty-first possible implementation, the apparatus further includes a fifth current sensor, a second voltage sensor, and a direct current switch; the direct current bus is connected to an input end of the power circuit via the direct current switch; the fifth current sensor is configured to: obtain an absolute value of a current of the direct current bus, and send the absolute value to the controller; and the second voltage sensor is configured to: obtain an absolute value of a voltage of the direct current bus, and send the absolute value to the controller.

With reference to the first aspect, in a twenty-second possible implementation, when a positive electrode and a negative electrode are short circuited or the direct current bus is short circuited inside the protection apparatus or a direct current bus in a next circuit is short circuited, a voltage of the direct current bus decreases, and a current of the direct current bus increases. Therefore, the controller is further configured to: when the absolute value of the current of the direct current bus is greater than a second current value and the absolute value of the voltage of the direct current bus is less than a first voltage value, control the direct current switch to be open, so that a circuit is protected.

With reference to the first aspect, in a twenty-third possible implementation, when the photovoltaic unit and a protection unit are connected in series or in parallel and are then connected to the apparatus via the interface, the protection switch is further configured to: when being open, prevent the protection unit from triggering a protection action.

In other words, when a photovoltaic power generation system that currently uses the protection unit is reconstructed, the protection unit may not need to be dismantled, so that the protection unit is directly connected to the open-circuit protection apparatus.

With reference to the first aspect, in a twenty-fourth possible implementation, the protection unit includes at least one of the following: a fuse, an optimizer, and a disconnection box.

With reference to the first aspect, in a twenty-fifth possible implementation, when the apparatus includes at least two protection switches, the at least two protection switches are controlled by a same controller or by a plurality of controllers.

With reference to the first aspect, in a possible implementation, the controller is specifically configured to: when the parameter detection value of the branch exceeds a first preset parameter value range, or when the parameter detection value of the direct current bus exceeds a second preset parameter value range, detect that the photovoltaic power generation system is faulty. The parameter detection value may be at least one of a voltage value, a current value, a power value, or a temperature value.

When the parameter detection value is abnormal, for example, a voltage of a branch decreases, a current of a branch increases, power of a branch increases, and a temperature of a branch increases, it may be detected that a short-circuit fault occurs in the branch.

With reference to the first aspect, in a possible implementation, the controller is specifically configured to: when a leakage current detection value of the direct current bus is greater than a third current value, or when a leakage current detection value of a branch is greater than a fourth current value, detect that the photovoltaic power generation system is faulty. When a leakage current detection value is abnormal, it indicates that a leakage current fault occurs in the photovoltaic power generation system. According to a solution of this application, the leakage current fault may be located to detect a branch in which the leakage current fault occurs, or the leakage current fault may be located at the direct current bus.

With reference to the first aspect, in a possible implementation, the controller is specifically configured to: when detecting, based on current detection values of all the branches, that an arc fault occurs in a branch or detecting, based on a current detection value of the direct current bus, that an arc fault occurs in the direct current bus, detect that the photovoltaic power generation system is faulty. The controller may specifically detect, based on an offset degree of a current detection value relative to a preset standard value, whether an arc fault occurs.

With reference to the first aspect, in a possible implementation, the controller is further configured to control, according to a control instruction sent by a host computer, the protection switch to be open or closed, to implement active control of the protection switch.

With reference to the first aspect, in a possible implementation, the maximum of three photovoltaic units are directly connected in parallel and are then connected to one interface, or the maximum of three photovoltaic units are connected in parallel inside the apparatus via corresponding interfaces.

With reference to the first aspect, in a possible implementation, the protection switch is a rotary direct current switch disconnector or direct current circuit breaker.

With reference to the first aspect, in a possible implementation, the controller is further configured to: after a preset time elapses when it is determined that a fault is rectified, control the protection switch to be closed.

With reference to the first aspect, in a possible implementation, the protection apparatus further includes a direct current/direct current converter; the direct current bus is connected to an input end of the direct current/direct current converter, and an output end of the direct current/direct current converter is an output end of the protection apparatus for the photovoltaic power generation system; and the direct current/direct current converter is configured to convert a direct current obtained from the direct current bus into a direct current for output. In this case, the protection apparatus for the photovoltaic power generation system is a boost direct current combiner box.

With reference to the first aspect, in a possible implementation, the protection apparatus further includes a direct current/alternating current converter; the direct current bus is connected to an input end of the direct current/alternating current converter, and an output end of the direct current/alternating current converter is an output end of the protection apparatus for the photovoltaic power generation system; and the direct current/alternating current converter is configured to convert a direct current obtained from the direct current bus into an alternating current for output. In this case, the protection apparatus for the photovoltaic power generation system is an inverter.

According to a second aspect, this application further provides a protection method for a photovoltaic power generation system. The method is applied to a protection apparatus. The protection apparatus is connected to at least two photovoltaic units via an interface, the at least two photovoltaic units are coupled to a direct current bus inside the apparatus to form at least two branches, and each branch is connected to at least one photovoltaic unit; and a protection switch is configured to disconnect all or some of the photovoltaic units from the direct current bus, so that a maximum of three photovoltaic units are directly connected in parallel. The method includes:

when determining, based on a parameter detection value of the branch or a parameter detection value of the direct current bus, that the photovoltaic power generation system is faulty, controlling the protection switch to be open.

With reference to the second aspect, in a possible implementation, the parameter detection value is a reverse current value, and the determining, based on a parameter detection value of the branch or a parameter detection value of the direct current bus, that the photovoltaic power generation system is faulty specifically includes: when a reverse current value of a branch is greater than a first current value, determining that the photovoltaic power generation system is faulty.

According to the method, when the protection switch is open, the maximum of three photovoltaic units are directly connected in parallel. Therefore, when one photovoltaic unit can tolerate output currents of two photovoltaic units, when a photovoltaic unit is faulty, a maximum of two normal photovoltaic units output currents to the photovoltaic unit. In this case, the currents fall within a tolerable range of the faulty photovoltaic unit, thereby protecting a photovoltaic component and a line from damage.

With reference to the second aspect, in a possible implementation, the parameter detection value is a reverse current value, and the determining, based on a parameter detection value of the branch or a parameter detection value of the direct current bus, that the photovoltaic power generation system is faulty specifically includes:

when a reverse current value of a branch is greater than a first current value, determining that the photovoltaic power generation system is faulty.

With reference to the second aspect, in a first possible implementation, the apparatus further includes a power circuit, the direct current bus is connected to an input end of the power circuit via a direct current switch, and the method further includes: when an absolute value of a current of the direct current bus is greater than a second current value and an absolute value of a voltage of the direct current bus is less than a first voltage value, controlling the direct current switch to be open.

According to the method, a short-circuit current can be cut off in a timely manner when a positive electrode and a negative electrode are short circuited inside the protection apparatus and a downstream bus is short circuited, so that the apparatus and the next circuit are protected.

With reference to the second aspect, in a second possible implementation, the power circuit is a direct current/direct current DC/DC conversion circuit or a direct current/alternating current DC/AC conversion circuit.

With reference to the second aspect, in a possible implementation, the parameter detection value is at least one of a voltage value, a current value, a power value, or a temperature value, and the determining, based on a parameter detection value of the branch or a parameter detection value of the direct current bus, that the photovoltaic power generation system is faulty specifically includes:

when the parameter detection value of the branch exceeds a first preset parameter value range, or when the parameter detection value of the direct current bus exceeds a second preset parameter value range, determining that the photovoltaic power generation system is faulty.

With reference to the second aspect, in a possible implementation, the determining, based on a parameter detection value of the branch or a parameter detection value of the direct current bus, that the photovoltaic power generation system is faulty specifically includes:

when a leakage current detection value of the direct current bus is greater than a third current value, or when a leakage current detection value of the branch is greater than a fourth current value, determining that the photovoltaic power generation system is faulty.

With reference to the second aspect, in a possible implementation, the determining, based on a parameter detection value of the branch or a parameter detection value of the direct current bus, that the photovoltaic power generation system is faulty specifically includes:

when determining, based on current detection values of all the branches, that an arc fault occurs in a branch or determining, based on a current detection value of the direct current bus, that an arc fault occurs in the direct current bus, determining that the photovoltaic power generation system is faulty.

According to a third aspect, this application further provides a photovoltaic power generation system, including at least two photovoltaic units and the protection apparatus in any one of the foregoing implementations. Each photovoltaic unit includes at least one photovoltaic component. When the photovoltaic unit includes a plurality of photovoltaic components, the photovoltaic components may be connected in series or in parallel.

When determining, based on a parameter detection value of a branch or a parameter detection value of a direct current bus, that the photovoltaic power generation system is faulty, a controller of the protection apparatus for the photovoltaic power generation system can control a protection switch to be open, so that a maximum of three photovoltaic units are directly connected in parallel, thereby protecting a photovoltaic unit and a line in the photovoltaic system. In addition, because only the protection switch is added to a circuit, and the protection switch has a smaller resistance than a fuse, a loss rate and a loss of the photovoltaic system are further reduced.

With reference to the third aspect, in a first possible implementation, the system further includes a protection unit, and the photovoltaic unit and the protection unit are connected in series or in parallel and are then connected to the protection apparatus via the interface.

Therefore, when a photovoltaic power generation system that currently uses the protection unit is reconstructed, the protection unit may not need to be dismantled, so that the protection unit is directly connected to the open-circuit protection apparatus.

With reference to the third aspect, in a second possible implementation, the protection unit may be one or a combination of a fuse, an optimizer, and a disconnection box.

When the protection apparatus includes a power circuit, the power circuit may be a direct current/direct current (DC/DC) conversion circuit. When the power circuit is a direct current/direct current conversion circuit, the direct current/direct current conversion circuit may be specifically a boost (Boost) circuit, a buck (Buck) circuit, or a buck-boost (Buck-Boost) circuit. In this case, the protection apparatus may be a direct current combiner box of the photovoltaic power generation system.

The power circuit may be alternatively a direct current/alternating current (DC/AC) conversion circuit, namely, an inverter (or referred to as an inverter circuit), configured to convert a direct current into an alternating current for output.

When the protection apparatus does not include a power circuit, the protection apparatus may be connected to an input end of a direct current combiner box or an inverter of the photovoltaic power generation system as an independent device.

It can be learned from the foregoing technical solutions that solutions provided in this application have at least the following advantages:

The protection apparatus for the photovoltaic power generation system provided in embodiments of this application may be applied to the photovoltaic power generation system. When the protection switch of the apparatus is open, the maximum of three photovoltaic units are directly connected in parallel. For example, when two photovoltaic units are directly connected to the direct current bus in parallel inside the apparatus, if a short-circuit fault occurs in one photovoltaic unit, only one normal photovoltaic unit outputs a short-circuit current to the photovoltaic unit. In this case, the short-circuit current falls within a tolerable range of the faulty photovoltaic unit, thereby protecting a photovoltaic component and a line from damage. A specific connection manner of the photovoltaic unit and the protection switch may be configured based on an actual requirement. When the controller of the protection apparatus can determine, based on the parameter detection value of the branch or the parameter detection value of the direct current bus, that the photovoltaic power generation system is faulty, the controller controls the protection switch to be open, so that the maximum of three photovoltaic units are directly connected in parallel, thereby protecting a photovoltaic unit and a line in the photovoltaic system. In addition, because only the protection switch is added to a circuit, and the protection switch has a smaller resistance than a fuse, a loss rate and a loss of the photovoltaic system are reduced. In addition, because the fuse is no longer used, a Y harness originally used for the built-in fuse may be disposed on a photovoltaic unit side instead of being disposed below an inverter or a direct current combiner box of the photovoltaic power generation system, so that cable costs are further reduced.

DESCRIPTION OF EMBODIMENTS

To improve a direct current ratio of a photovoltaic power generation system, each MPPT component is usually connected to at least two photovoltaic units or more photovoltaic units. In addition, to protect a photovoltaic unit and a line when the photovoltaic unit or the line is short circuited, a positive output end and/or a negative output end of the photovoltaic unit are or is connected to disconnector or a fuse in series. The following describes an example in which each MPPT component is connected to three branches. A principle when each MPPT component is connected to more branches is similar, and details are not described herein again.

Figure 1:
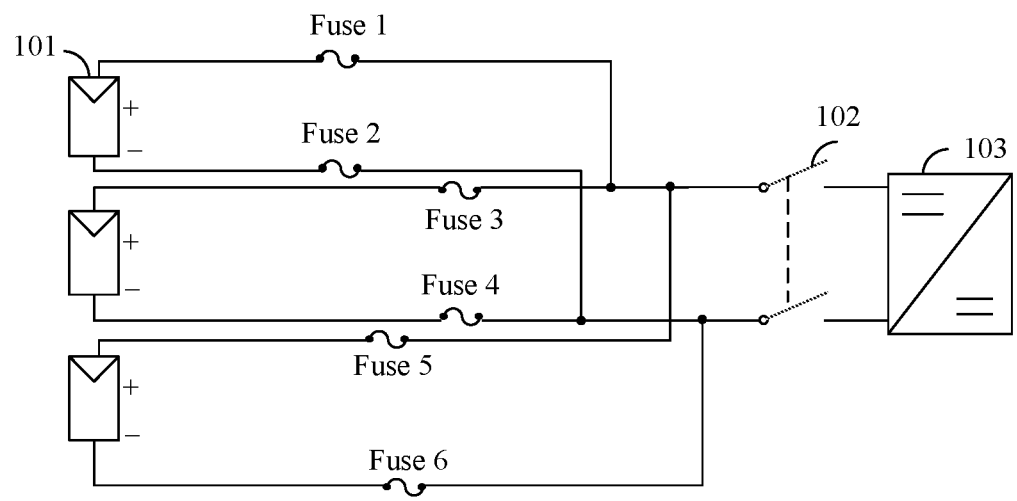
FIG. 1 is a schematic diagram of a protection apparatus used in the conventional art.
Figure 2:
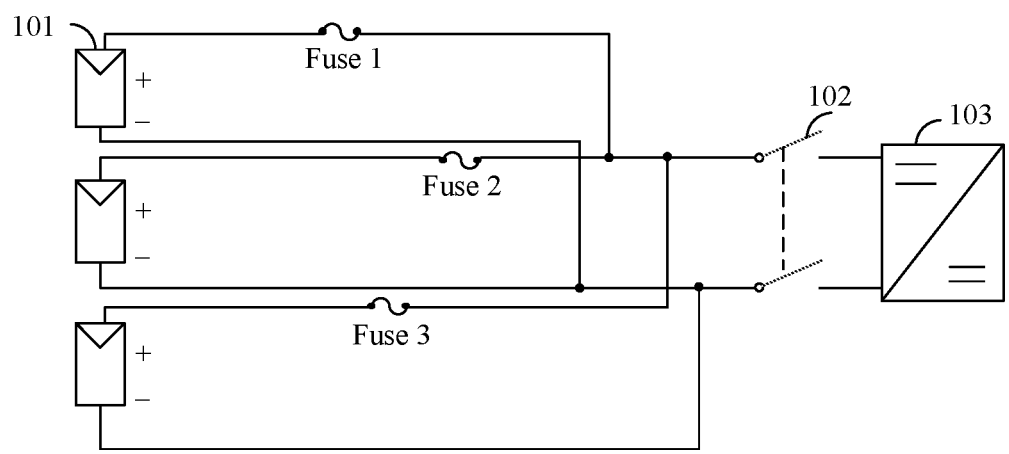
FIG. 2 is a schematic diagram of a protection apparatus used in the conventional art.
Figure 3:
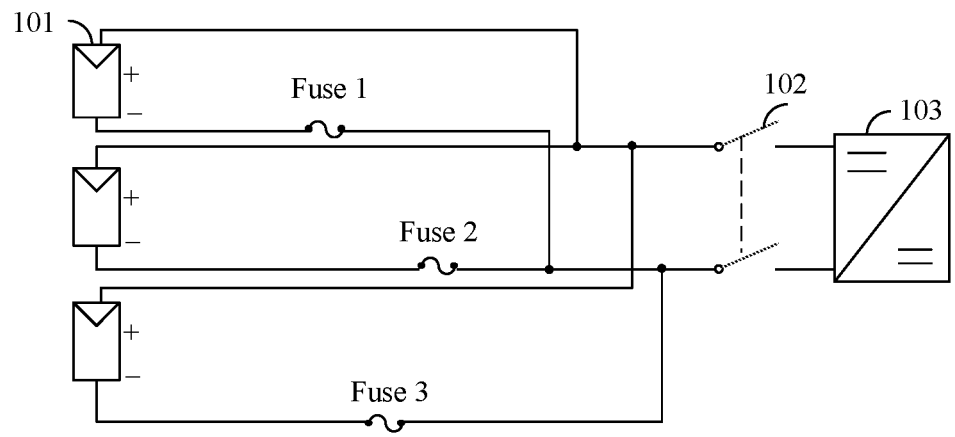
FIG. 3 is a schematic diagram of a protection apparatus used in the conventional art.

Refer to FIG. 1 to FIG. 3. FIG. 1 is a schematic diagram in which both a positive output end and a negative output end of a photovoltaic unit are connected to fuses in series. FIG. 2 is a schematic diagram in which a positive output end of a photovoltaic unit is connected to a fuse in series. FIG. 3 is a schematic diagram in which a negative output end of a photovoltaic unit is connected to a fuse in series.

Each branch includes one photovoltaic component 101. Three branches are connected in parallel before a switch 102 and are then connected to an MPPT component 103 via the direct current switch 102. A fuse 1 to a fuse 6 in FIG. 1, a fuse 1 to a fuse 3 in FIG. 2, and a fuse 1 to a fuse 3 in FIG. 3 are fuses that blow when a current in a line is excessively large to protect the photovoltaic component and the line.

However, because an actual output current of the photovoltaic unit is relatively small, the fuse can hardly blow. A fuse whose rated current is 15 A is used as an example. Based on standard provisions of the fuse, a current allowed when the fuse does not blow may be up to 1.13×15=16.95 A, and a current required for the fuse to blow in one hour is 1.35×15=20.25 A. However, a short-circuit current can hardly meet the current required for the fuse to blow. Therefore, the fuse may not blow, and a photovoltaic unit and a line cannot be effectively protected. In addition, a resistance of each fuse can be up to 9 milliohms. Therefore, problems of a relatively large power loss and heat generation exist. In some embodiments, because a cable needs to be protected, a Y harness of a built-in fuse further needs to be disposed below an apparatus, further leading to an increase in cable costs.

To resolve the foregoing technical problems, this application provides a protection apparatus, a short circuit protection method, and a photovoltaic power generation system, to effectively protect a photovoltaic unit and a line with a low power loss when the photovoltaic unit or the line is short circuited. The following provides detailed description with reference to the accompanying drawings.

The following terms "first", "second", and the like are merely intended for a purpose of description, and shall not be understood as an indication or implication of relative importance or implicit indication of a quantity of indicated technical features. Therefore, a feature limited by "first", "second", or the like may explicitly or implicitly include one or more such features.

In this application, unless otherwise expressly specified and limited, the term "connect" should be understood in a broad sense. For example, a "connection" may be a fixed connection, may be a detachable connection, or may be connection to form a whole; and may be a direct connection, or an indirect connection through an intermediate medium.

To make persons skilled in the art understand technical solutions of the present application better, the following example describes technical solutions in embodiments of this application with reference to the accompanying drawings.

Apparatus Embodiment 1

A single photovoltaic unit in the following embodiments may include one photovoltaic component, or may be formed by connecting a plurality of photovoltaic components in series and/or in parallel. For example, a plurality of photovoltaic units are first connected in series to form a photovoltaic string, and then a plurality of photovoltaic strings are connected in parallel to form a photovoltaic unit. A specific quantity of photovoltaic components included in the photovoltaic unit is not specifically limited in this embodiment of this application, and may be set by persons skilled in the art based on an actual requirement. In addition, an electrical parameter of a single photovoltaic component is not specifically limited in this embodiment of this application. Output voltages of a plurality of photovoltaic units connected to a same apparatus may be the same or different, and this is not specifically limited in this embodiment of this application.

A protection apparatus provided in this embodiment of this application is applied to a photovoltaic power generation system, and can be connected to at least two photovoltaic units via an interface. After the photovoltaic units are connected to the protection apparatus via the interface, the photovoltaic units can be directly connected to a direct current bus in parallel inside the apparatus, or the photovoltaic units and a protection switch can be connected in series and then connected to a direct current bus in parallel, so that output currents of the photovoltaic units are aggregated into the direct current bus, and further, at least two branches are formed inside the apparatus. Each branch is connected to at least one photovoltaic unit. The following first describes a presence form of the branch in detail.

Figure 4:
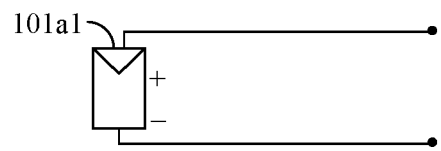
FIG. 4 is a schematic diagram of a branch according to an embodiment of this application.

FIG. 4 is a schematic diagram of a branch according to an embodiment of this application.

The branch includes one photovoltaic unit $101a1$, a positive output end of the photovoltaic unit $101a1$ is a positive output end of the branch, and a negative output end of the photovoltaic unit $101a1$ is a negative output end of the branch.

Figure 5:
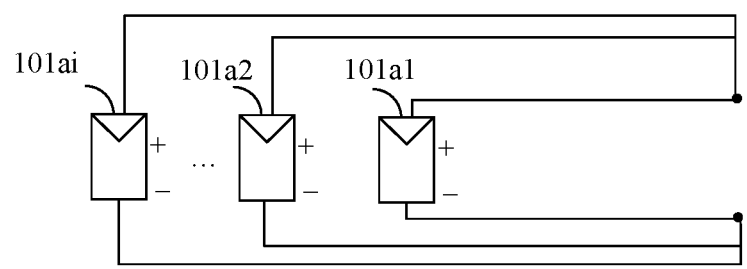
FIG. 5 is a schematic diagram of another branch according to an embodiment of this application.

FIG. 5 is a schematic diagram of another branch according to an embodiment of this application.

The branch may include a plurality of branches shown in FIG. 4, and therefore includes at least two photovoltaic units, which are sequentially $101a1, 101a2, \ldots$, and $101a1$, for example. In some embodiments, when the branch includes a plurality of photovoltaic units, the branch may further include a protection switch to implement protection of the photovoltaic units and lines.

It may be understood that the branch in this embodiment of this application is a concept in the electrical field, and refers to a route through which a branch current of a parallel circuit flows. Continuing with the example of FIG. 5, a line in which the photovoltaic unit $101a1$ is located may be referred to as one branch, and a line formed after the photovoltaic unit $101a1$ and the photovoltaic unit $101a2$ are connected in parallel may also be referred to as one branch.

Positive output ends of all photovoltaic units are aggregated to form a positive output end of the branch, and negative output ends of all the photovoltaic units are aggregated to form a negative output end of the branch.

The "branch" in the following embodiments is specifically a general term for all branches shown in FIG. 4 and FIG. 5, that is, a general term for all branches except a trunk (direct current bus).

The following describes a working principle of the protection apparatus in detail with reference to the accompanying drawings.

Figure 6A:
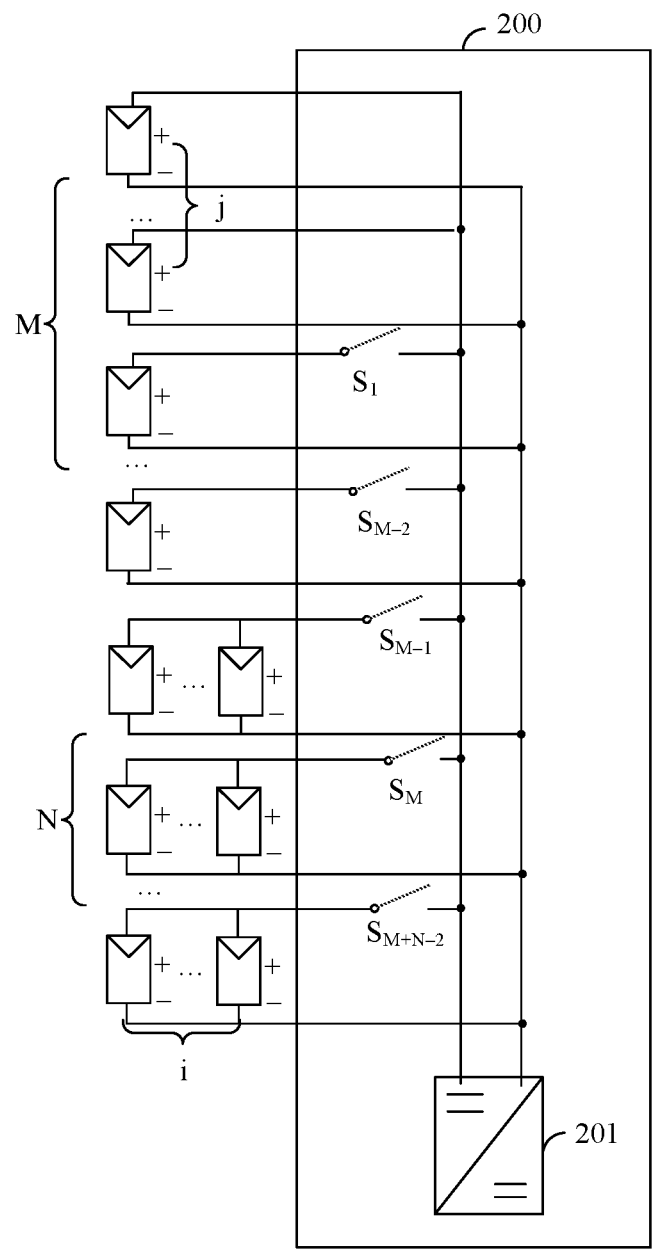
FIG. 6A is a schematic diagram of a protection apparatus according to an embodiment of this application.

FIG. 6A is a schematic diagram of a protection apparatus according to an embodiment of this application.

The protection apparatus 200 includes an interface, protection switches $S_1$ to $S_{M-1}$, a direct current bus, and a controller.

The apparatus 200 may be connected to at least two photovoltaic units via an interface. A quantity of connected photovoltaic units is not specifically limited in this application. The at least two photovoltaic units are coupled to the direct current bus inside the apparatus to form at least two branches, and each branch is connected to at least one photovoltaic unit.

When the protection apparatus is applied to a photovoltaic power generation system, the direct current bus specifically includes a positive direct current bus and a negative direct current bus.

The protection switches $S_1$ to $S_{M-1}$ are configured to disconnect all or some of the photovoltaic units from the direct current bus, so that a maximum of three photovoltaic units are directly connected in parallel, in other words, are configured to: when being open, enable a maximum of three photovoltaic units to directly connect to the direct current bus in parallel inside the apparatus.

For example, when a short-circuit fault occurs in a single photovoltaic unit, and the faulty photovoltaic unit can tolerate an output current of one other normal photovoltaic unit, when the protection switches $S_1$ to $S_{M-1}$ are open, a maximum of two photovoltaic units are directly connected in parallel inside the apparatus. In this case, values of i and j in the figure are 2.

For another example, when a short-circuit fault occurs in a single photovoltaic unit, and the faulty photovoltaic unit can tolerate output currents of two other normal photovoltaic units, when the protection switches $S_1$ to $S_{M-1}$ are open, the maximum of three photovoltaic units are directly connected in parallel inside the apparatus. In this case, values of i and j in the figure are 3.

Specifically, i and j are determined by an actual current tolerance value of the photovoltaic unit. This is not specifically limited in this embodiment of this application. It should be noted that FIG. 6 is only for ease of drawing and description, and i photovoltaic units in the figure are actually connected in parallel inside the protection apparatus.

For ease of description, the following describes an example in which the values of i and j are 2. In some other embodiments, a principle when the values of i and j are 3 is similar, and details are not described again in this application.

The controller is configured to: when determining, based on a parameter detection value of the branch or a parameter detection value of the direct current bus, that the photovoltaic power generation system is faulty, control the protection switch to be open. The following describes a short-circuit fault as an example. Specifically, when the parameter detection value is a reverse current value, the controller is specifically configured to: when a reverse current value of a branch is greater than a first current value, determine that the photovoltaic power generation system is faulty.

The following describes a principle of implementing a protection function by the controller.

When there is no short-circuit fault, currents of all branches are aggregated into the direct current bus. Therefore, an absolute value of a current of the direct current bus is greater than an absolute value of a current of any branch. A current direction is flowing from a positive electrode of a photovoltaic unit to the positive direct current bus. When a short-circuit fault occurs in any branch, output currents of all other normal branches flow to the branch in which a short-circuit fault occurs. In this case, a voltage of the direct current bus decreases, and a current direction of a branch flows to the branch in which a short-circuit fault occurs, in other words, a reverse current of a branch is greater than the first current value. The first current value may be determined based on an actual case. This is not specifically limited in this embodiment of this application. Preferably, to find a short-circuit fault and trigger a protection action of the protection switch as early as possible, the first current value may be a relatively small value, for example, 0. In other words, when a reverse current occurs in a branch, the controller controls the protection switch to be open.

In this case, the controller determines that a short-circuit fault occurs in a photovoltaic unit or a line, and controls the protection switch to be open to protect the photovoltaic unit and the line.

In some embodiments, the protection apparatus 200 further includes a power circuit 201, the power circuit is configured to perform power conversion, and the power circuit may be a direct current/direct current (DC/DC) conversion circuit or a direct current/alternating current (DC/AC) conversion circuit.

When the power circuit 201 is a direct current/direct current conversion circuit, the direct current/direct current conversion circuit may be specifically a boost (Boost) circuit, a buck (Buck) circuit, or a buck-boost (Buck-Boost) circuit. In this case, the protection apparatus may be a direct current combiner box of the photovoltaic power generation system. This is not specifically limited in this application.

When the power circuit 201 is a direct current/alternating current circuit, the direct current/alternating current circuit is configured to convert a direct current into an alternating current for output. In this case, the protection apparatus may be used as an inverter of the photovoltaic power generation system.

In some other embodiments, the protection apparatus may be alternatively disposed at an input end of a direct current combiner box or an inverter of the photovoltaic power generation system as an independent apparatus.

The protection apparatus provided in this embodiment of this application may be connected to a plurality of photovoltaic units via the interface. When the protection switch of the apparatus is open, the maximum of three photovoltaic units are directly connected in parallel inside the apparatus, to protect a photovoltaic component and a line from damage. A specific connection manner of the photovoltaic unit and the protection switch may be configured based on an actual requirement. When a reverse current of a branch is greater than the first current value, the controller of the apparatus can control the protection switch to be open, to protect a photovoltaic unit and a line in the photovoltaic system. In addition, because only the protection switch is added to a circuit, and the protection switch has a smaller resistance than a fuse, a loss rate and a loss of the photovoltaic system are further reduced. In addition, because the fuse is no longer used, a Y harness originally used for the built-in fuse may be disposed on a photovoltaic unit side instead of being disposed below the inverter or the direct current combiner box of the photovoltaic power generation system, so that cable costs are further reduced.

The foregoing description uses an example in which a faulty photovoltaic component is allowed to tolerate a reverse current from another photovoltaic component. In actual application, to better meet a safety specification requirement, the protection switch is configured to disconnect all the photovoltaic units from the direct current bus. For details, refer to FIG. 6B.

Figure 6B:
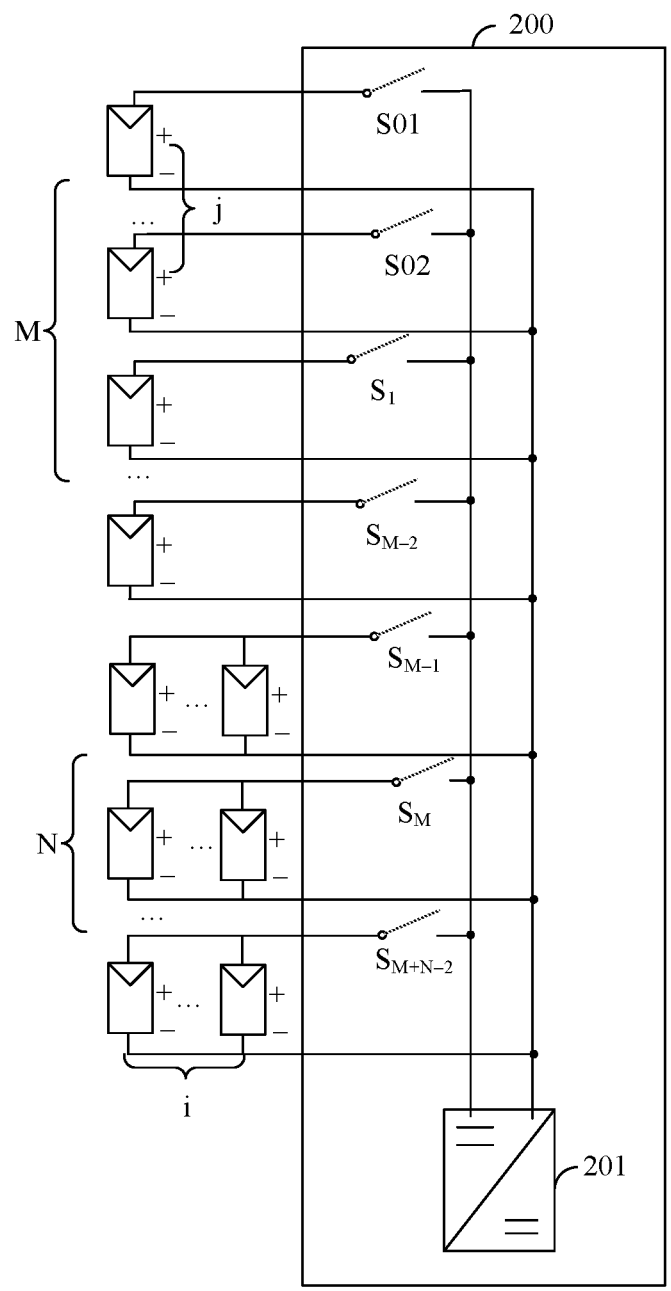
FIG. 6B is a schematic diagram of another protection apparatus according to an embodiment of this application.
Figure 6C:
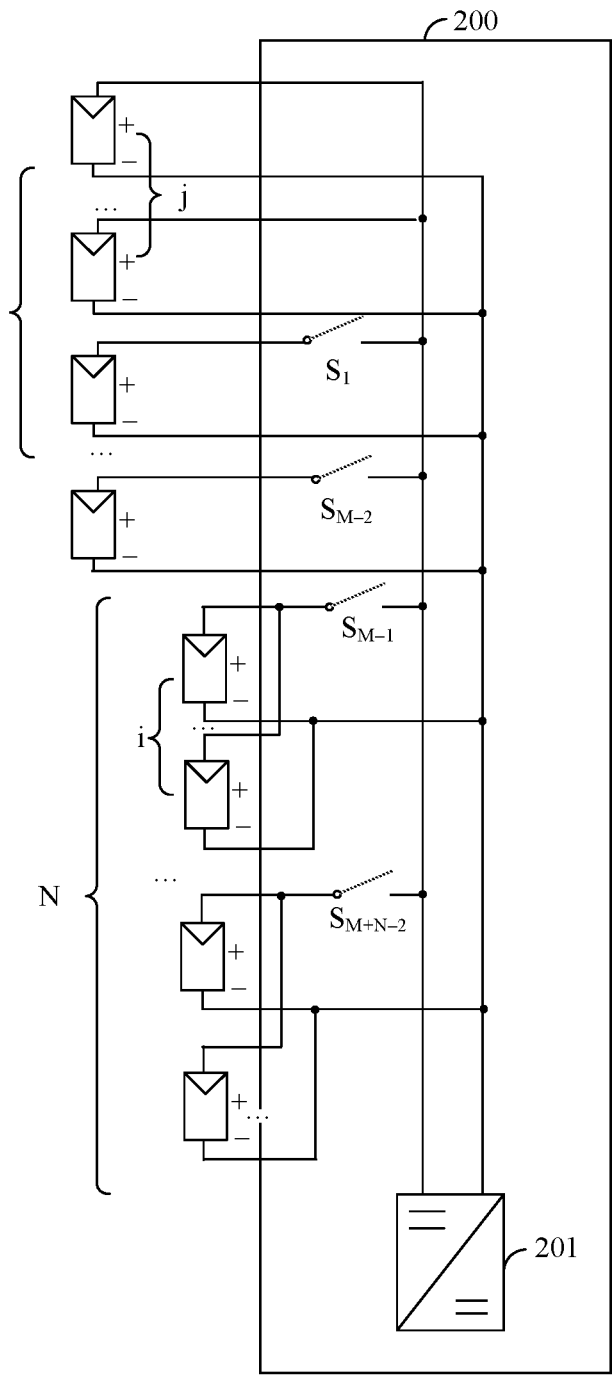
FIG. 6C is a schematic diagram of still another protection apparatus according to an embodiment of this application.

FIG. 6B is a schematic diagram of another protection apparatus according to an embodiment of this application.

FIG. 6B differs from FIG. 6A in that protection switches S01 and S02 are further included, so that when all protection switches are open, all the photovoltaic units are disconnected from the direct current bus, in other words, connection lines between all interfaces and the direct current bus are disconnected.

In addition, the foregoing description uses an example in which the maximum of three photovoltaic units are directly connected in parallel and are then connected to one interface. In some other embodiments, the maximum of three photovoltaic units are connected in parallel inside the apparatus via corresponding interfaces. For a specific implementation, refer to FIG. 6C.

In some embodiments, when an absolute value of a current of a branch is greater than the absolute value of the current of the direct current bus, or when a reverse current of a branch is greater than the first current value, the controller specifically determines that the reverse current of the branch is greater than the first current value, and controls the protection switch to be open. The following describes a working principle of the controller with reference to specific implementations.

Apparatus Embodiment 2

The following describes an example in which a protection apparatus is connected to two photovoltaic units.

Figure 7:
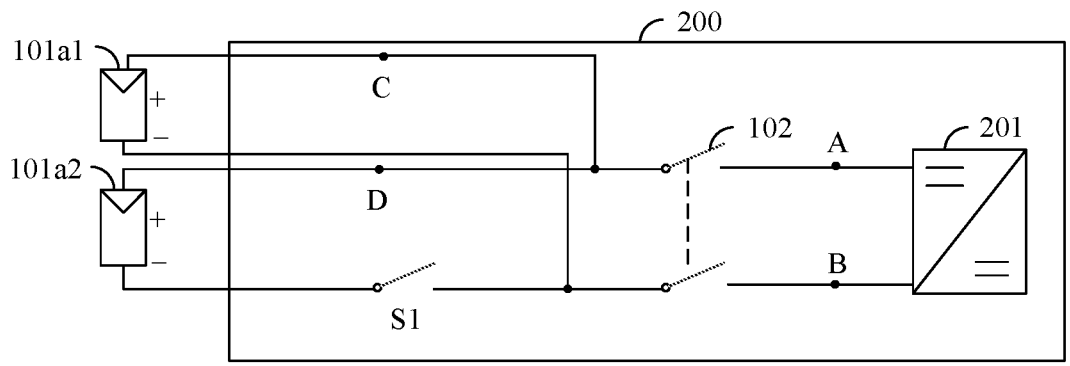
FIG. 7 is a schematic diagram of another protection apparatus according to an embodiment of this application.

FIG. 7 is a schematic diagram of another protection apparatus according to an embodiment of this application.

The protection apparatus 200 is connected to two photovoltaic units 101a1 and 101a2 via an interface.

The two photovoltaic units are connected in parallel inside the protection apparatus 200 and are then connected to a power circuit 201 via a direct current switch 102. The direct current switch 102 is configured to protect a circuit. In some embodiments, a direct connection may be performed instead of disposing the direct current switch 102.

At least one photovoltaic unit is further connected to a protection switch S1 in series.

The following describes a principle of implementing a protection function by a controller by using an absolute value of a detection current.

When there is no short-circuit fault, currents of the two photovoltaic units are aggregated into a direct current bus, and an absolute value of a current of the direct current bus (an absolute value of a detection current of a detection point A or a detection point B) is greater than an absolute value of a current of any branch (an absolute value of a detection current of a detection point C or a detection point D).

When a short-circuit fault occurs in one photovoltaic unit, an output current of the other normal photovoltaic unit flows to the short-circuit photovoltaic unit. In this case, the absolute value of the current of the direct current bus is less than an absolute value of a current of any branch.

When an absolute value of a current of a branch is greater than the absolute value of the current of the direct current bus, the controller controls the protection switch S1 to be open.

Specifically, when a short-circuit fault occurs in a branch in which the photovoltaic unit 101a1 is located, the protection switch S1 is open, so that the photovoltaic unit 101a2 stops outputting a current, thereby protecting the photovoltaic unit and a line. When a short-circuit fault occurs in a branch in which the photovoltaic unit 101a2 is located, the protection switch S1 is open, so that the short-circuit branch is disconnected, and the photovoltaic unit 101a1 can continue to output a current to the apparatus 200 to maintain a normal working state.

In some embodiments, a magnitude and a direction of a current may be detected by using a current sensor, and the current sensor sends a detection result to the controller of the apparatus 200.

In the foregoing implementation, the absolute value of the current of the point A or the point B may be detected by using a first current sensor, and the absolute value of the current of the point C or the point D may be detected by using a second current sensor.

In some embodiments, the protection switch S1 may be connected to a positive output end of the photovoltaic unit 102a2 in series, or may be connected to a negative output end of the photovoltaic unit 102a2 in series, or one photovoltaic unit may be connected to each of a positive output end and a negative output end of the photovoltaic unit 102a2 to implement redundancy control. This is not specifically limited in this embodiment of this application.

The following describes a principle of implementing a protection function by a controller by using a direction of a detection current.

When there is no short-circuit fault, current directions of a detection point C and a detection point D may be set to a preset direction, for example, may be set to a positive direction.

When a short-circuit fault occurs in a branch in which the photovoltaic unit 101a1 is located, an output current of the photovoltaic unit 101a2 flows to the branch in which the photovoltaic unit 101a1 is located, and therefore the current direction of the detection point C is opposite to the preset current direction and is a negative direction. In this case, the controller controls the protection switch ST to be open, so that the photovoltaic unit 101a2 stops outputting a current, thereby protecting the photovoltaic unit and a line. When a short-circuit fault occurs in a branch in which the photovoltaic unit 101a2 is located, an output current of the photovoltaic unit 101a1 flows to the branch in which the photovoltaic unit 101a2 is located, and therefore the current direction of the detection point D is opposite to the preset current direction. In this case, the controller controls the protection switch S1 to be open, so that the short-circuit branch is disconnected, and the photovoltaic unit 101a1 can continue to normally output a current to the protection apparatus 200.

In this manner, the current direction of the point C may be detected by using a third current sensor, and the current direction of the point D may be detected by using a fourth current sensor.

The detection point C and the detection point D in the foregoing embodiment may be alternatively located on negative output end sides of corresponding photovoltaic units, or one is located on a positive output end side of a photovoltaic unit, and the other is located on a negative output end side of a photovoltaic unit. In this case, a working principle of the controller is similar, and details are not described herein again.

When the protection apparatus is connected to two photovoltaic units via the interface, when an absolute value of a current of a branch is greater than the absolute value of the current of the direct current bus, or when a current direction of a branch is opposite to a preset current direction, the controller of the protection apparatus controls the protection switch to be open, so that a current of any branch is less than a first current value, thereby protecting a photovoltaic unit and a line. In addition, because only the protection switch is added to the circuit, and the protection switch has a smaller resistance than a fuse (in some embodiments, a resistance of an applied protection switch is only approximately 0.3 milliohms, and is less than a resistance of the fuse), a loss rate and a loss are further reduced. In addition, a Y terminal may also be disposed on a photovoltaic unit side, so that cable costs are reduced.

The foregoing embodiment describes an example in which the protection apparatus is connected to two photovoltaic units. However, currently, to improve a direct current ratio of a photovoltaic power generation system, the protection apparatus is usually correspondingly connected to three, four, or more photovoltaic units. The following first describes a working principle when each apparatus is correspondingly connected to three photovoltaic units.

Apparatus Embodiment 3

Figure 8:
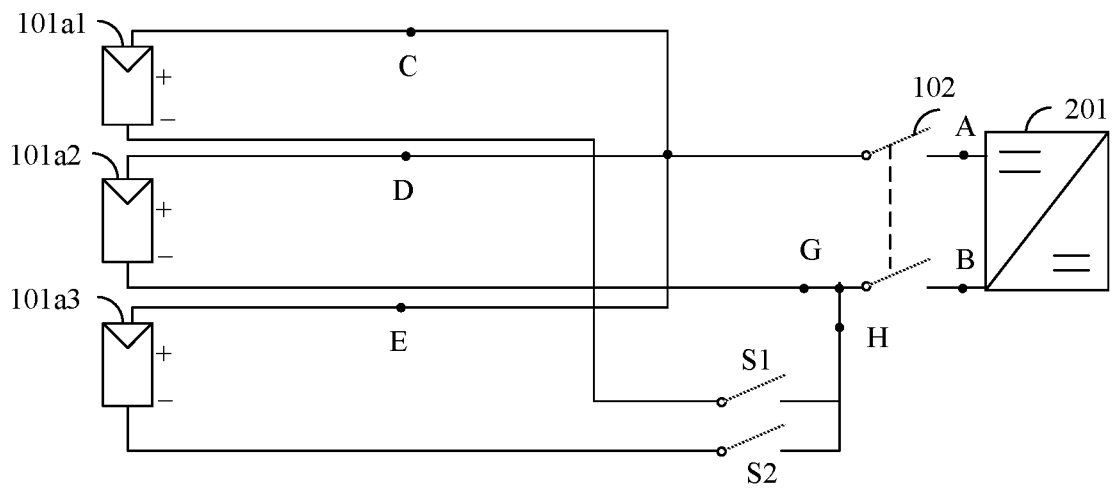
FIG. 8 is a schematic diagram of still another protection apparatus according to an embodiment of this application.

FIG. 8 is a schematic diagram of still another protection apparatus according to an embodiment of this application.

Positive output ends of three photovoltaic units are connected in parallel inside the protection apparatus and are then connected to a power circuit 201 via a direct current switch 102. The direct current switch 102 is configured to protect a circuit. In actual application, a direct connection may be performed instead of disposing the direct current switch 102.

A photovoltaic unit 101a1 and a protection switch S1 are connected in series and are then connected to a direct current bus, and a photovoltaic unit 101a3 and a protection switch S2 are connected in series and are then connected to the direct current bus in parallel.

The following describes a principle of implementing a protection function by a controller by using an absolute value of a detection current.

When there is no short-circuit fault, output currents of the three photovoltaic units are aggregated into the direct current bus, and therefore an absolute value of a current of the direct current bus (an absolute value of a detection current of a detection point A or a detection point B) is greater than an absolute value of a current of any branch (absolute values of detection currents of a detection point C, a detection point D, and a detection point E).

When a short-circuit fault occurs in a photovoltaic unit, output currents of other normal photovoltaic units flow to the photovoltaic unit in which a short-circuit fault occurs. In this case, the absolute value of the current of the direct current bus is less than an absolute value of a current of any branch.

When the absolute value of the current of the direct current bus is less than an absolute value of a current of any branch, the controller of the protection apparatus controls the protection switches S1 and S2 to be open, so that a current flowing to a short-circuit branch is zero, thereby protecting the photovoltaic unit and a line.

In this implementation, the absolute value of the current of the direct current bus (namely, the detection point A or B) may be detected by using a first current sensor, and an absolute value of a current of any branch (namely, the detection point C, D, or E) may be detected by using a second current sensor.

The following describes a principle of implementing a protection function by a controller by using a direction of a detection current.

When there is no short-circuit fault, current directions of a point C, a point D, and a point E may be set to a preset current direction, for example, may be set to a positive direction.

When a short-circuit fault occurs in a photovoltaic unit, output currents of other normal photovoltaic units flow to the photovoltaic unit in which a short-circuit fault occurs, and therefore a current direction in the photovoltaic unit in which a short-circuit fault occurs is opposite to the preset direction. In this case, the controller controls the protection switches S1 and S2 to be open, so that a current flowing to a short-circuit branch is zero, thereby protecting the photovoltaic unit and a line.

In this manner, current directions of three first-type photovoltaic unit branches may be separately detected by using three current sensors.

In another possible implementation, to reduce a quantity of used current sensors, whether a short-circuit fault occurs may be alternatively determined by detecting current directions of a point G and a point H. When a short-circuit fault occurs in a branch in which the photovoltaic units 101a1 or 101a3 are located, the current detection direction of the point H is opposite to a preset current direction. When a short-circuit fault occurs in a branch in which a photovoltaic unit 101a2 is located, the current detection direction of the point G is opposite to the preset current direction. When a current detection direction of the point H or the point G is opposite to the preset current direction, the controller may control the protection switch to be open to protect a photovoltaic unit and a line.

In this manner, the current direction of the point G may be detected by using a third current sensor, and the current direction of the point H may be detected by using a fourth current sensor. Compared with the foregoing implementation, this can reduce a quantity of used current sensors.

In some embodiments, a direct connection may be performed instead of disposing the protection switch S1 or the protection switch S2. In this case, after the controller controls the protection switch to be open, a current flowing to a branch in which a short-circuit fault occurs is less than a first current value.

When the protection apparatus is connected to three photovoltaic units via the interface, when an absolute value of a current of a photovoltaic unit is greater than the absolute value of the current of the direct current bus, or when a current direction of a branch is opposite to a preset current direction, the controller can control the protection switch to be open, so that a current of any branch is less than the first current value, thereby protecting a photovoltaic unit and a line. In addition, because only the protection switch is added to the circuit, and the protection switch has a smaller resistance than a fuse, a loss rate and a loss are further reduced. In addition, a Y terminal may also be disposed on a photovoltaic unit side, so that cable costs are reduced.

Apparatus Embodiment 4

Figure 9:
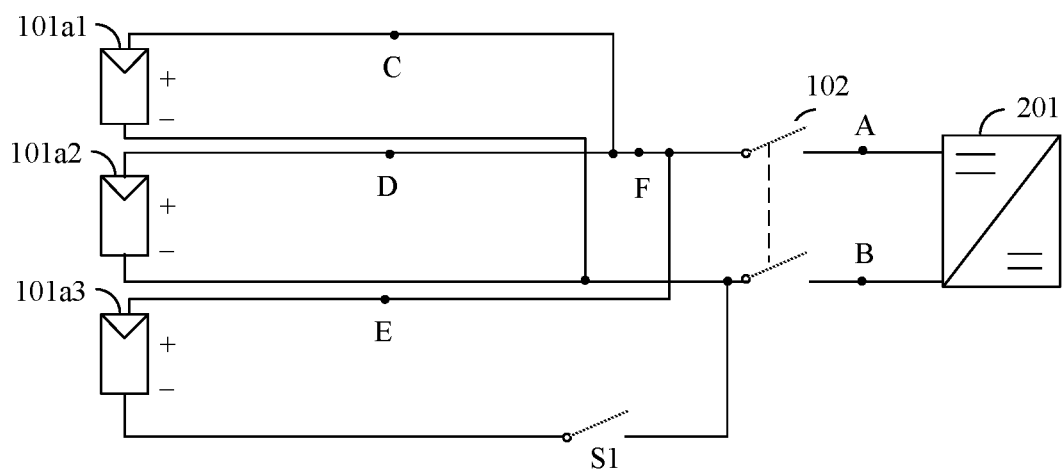
FIG. 9 is a schematic diagram of yet another protection apparatus according to an embodiment of this application.

FIG. 9 is a schematic diagram of yet another protection apparatus according to an embodiment of this application.

Photovoltaic units 101a1 and 101a2 are directly connected in parallel inside the protection apparatus and are then connected to a direct current bus, and a photovoltaic unit 101a3 and a protection switch S1 are connected in series and are then connected to the direct current bus of the apparatus in parallel.

A direct current switch 102 is configured to protect a circuit. In some embodiments, a direct connection may be performed instead of disposing the direct current switch 102. An example in which the protection switch S1 is connected to a negative electrode of the photovoltaic unit 101a3 in series is described. In some embodiments, the protection switch S1 may be alternatively connected to a positive electrode of the photovoltaic unit 101a3 in series.

The following describes a principle of implementing a protection function by a controller by using an absolute value of a detection current.

When there is no short-circuit fault, currents of all branches are aggregated into the direct current bus, and therefore an absolute value of a current of the direct current bus (an absolute value of a detection current of a detection point A or a detection point B) is greater than an absolute value of a current of any branch (absolute values of detection currents of detection points C, D, E, and F).

When a short-circuit fault occurs in a branch, an output current of a normal branch flows to the branch in which a short-circuit fault occurs. In this case, the absolute value of the current of the direct current bus is less than an absolute value of a current of any branch.

Therefore, when an absolute value of a current of a branch is greater than the absolute value of the current of the direct current bus, the controller of the protection apparatus controls the protection switch S1 to be open. Specifically, when a short-circuit fault occurs in a branch in which the photovoltaic unit 101a3 is located, the protection switch S1 is open, so that a current flowing to the faulty branch is zero, and the photovoltaic units 101a1 and 101a2 can further normally output currents. When a short-circuit fault occurs in branches in which the photovoltaic units 101a1 and 101a2 are located, the protection switch ST is open, so that a branch in which the photovoltaic unit 101a3 is located stops outputting a current to the faulty branch, thereby protecting the photovoltaic unit and a line.

In this implementation, the absolute value of the current of the direct current bus (the detection point A or the detection point B) may be detected by using a first current sensor, and an absolute value of a current of any branch (any one of the detection points C, D, E, and F) may be detected by using a second current sensor, in other words, two current sensors are required.

The following describes a principle of implementing a protection function by a controller by using a direction of a detection current.

When there is no short-circuit fault, current directions of detection points E and F may be set to a preset direction, for example, may be set to a positive direction.

When a short-circuit fault occurs in a branch in which the photovoltaic unit 101a3 is located, the current direction of the detection point E is opposite to the preset current direction. When a short-circuit fault occurs in branches in which the photovoltaic units 101a1 and 101a2 are located, the current direction of the detection point F is opposite to the preset current direction.

Therefore, this implementation may be implemented by separately detecting the current directions of the point E and the point F by using two current sensors. When a detection result opposite to the preset current direction exists in the detected current directions, the controller controls the protection switch ST to be open to protect a photovoltaic unit and a line.

Figure 10:
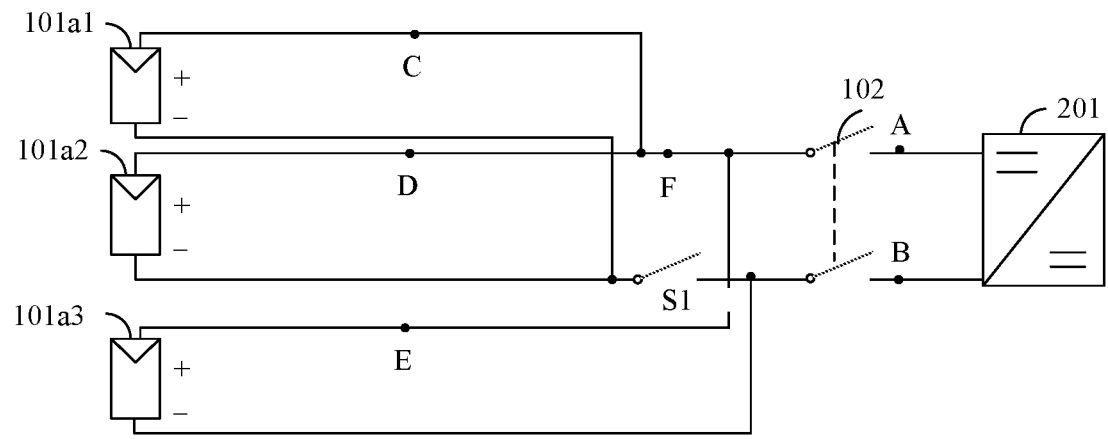
FIG. 10 is a schematic diagram of another protection apparatus according to an embodiment of this application.

FIG. 10 is a schematic diagram of another protection apparatus according to an embodiment of this application.

The protection apparatus in FIG. 10 differs from that in FIG. 9 in that the protection switch S1 is connected to negative output ends of the photovoltaic units 101a1 and 101a2 in series (or may be connected to positive output ends of the photovoltaic units 101a1 and 101a2 in series). In this case, a working principle of the controller is similar to the foregoing description, and details are not described again in this embodiment of this application.

The detection points C, D, and E in the foregoing embodiment may be alternatively located on negative output end sides of corresponding photovoltaic units.

When the protection apparatus is connected to three photovoltaic units via an interface, when an absolute value of a current of any branch is greater than the absolute value of the current of the direct current bus, or when a current direction of any branch is opposite to a preset current direction, the controller of the protection apparatus can control the protection switch to be open to protect a photovoltaic unit and a line. In addition, because only the protection switch is added to the circuit, and the protection switch has a smaller resistance than a fuse, a loss rate and a loss are further reduced. In addition, a Y terminal may also be disposed on a photovoltaic unit side, so that cable costs are reduced.

The foregoing embodiment describes an example in which an input end of each apparatus includes three photovoltaic units. The following describes a working principle when each apparatus is correspondingly connected to four photovoltaic units.

Apparatus Embodiment 5

Figure 11:
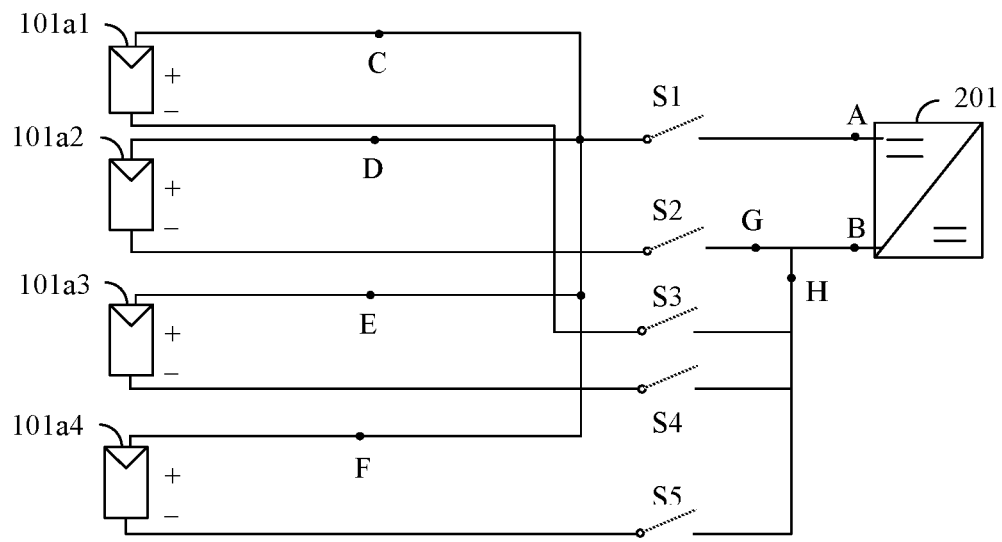
FIG. 11 is a schematic diagram of still another protection apparatus according to an embodiment of this application.

FIG. 11 is a schematic diagram of still another protection apparatus according to an embodiment of this application.

Positive output ends of four photovoltaic units are aggregated at a protection switch S1 of a positive direct current bus inside the protection apparatus, and a negative output end of each first-type photovoltaic unit branch and one protection switch are connected in series inside the protection apparatus and are then aggregated at a negative direct current bus.

The following describes a principle of implementing a protection function by a controller by using an absolute value of a detection current.

When there is no short-circuit fault, currents of the four photovoltaic units are aggregated into the direct current bus, and therefore an absolute value of a current of the direct current bus (an absolute value of a detection current of a detection point A or B) is greater than an absolute value of a current of any branch (absolute values of detection currents of detection points C, D, E, and F).

When a short-circuit fault occurs in a photovoltaic unit, output currents of other normal photovoltaic units flow to the photovoltaic unit in which a short-circuit fault occurs. In this case, the absolute value of the current of the direct current bus is less than an absolute value of a current of any branch, and the controller controls the protection switch to be open, so that a current flowing to a short-circuit branch is 0.

In this implementation, the absolute value of the current of the direct current bus, namely, the point A and the point B, may be detected by using a first current sensor, and an absolute value of a current of any first-type photovoltaic unit branch (any one of the detection points C, D, E, and F) may be detected by using a second current sensor.

The following describes a principle of implementing a protection function by a controller by using a direction of a detection current.

When there is no short-circuit fault, current directions of a point C, a point D, a point E, and a point F may be set to a preset direction, for example, may be set to a positive direction.

When a short-circuit fault occurs in a photovoltaic unit, output currents of other normal photovoltaic units flow to the short-circuit photovoltaic unit, and therefore a current direction of a branch in which the short-circuit photovoltaic unit is located is opposite to the preset direction. In this case, the controller controls the protection switch to be open, so that a current flowing to the faulty branch is zero, thereby protecting the photovoltaic unit and a line.

In this implementation, current directions of four first-type photovoltaic unit branches may be separately detected by using four current sensors.

In another possible implementation, to reduce a quantity of used current sensors, whether a short-circuit fault occurs may be alternatively determined by detecting current directions of a point G and a point F.

When there is no short-circuit fault, the current directions of the point G and the point H may be set to a preset direction, for example, may be set to a positive direction.

When a short-circuit fault occurs in branches in which photovoltaic units 101a1, 101a3, and 101a4 are located, the current detection direction of the point H is opposite to the preset current direction. When a short-circuit fault occurs in a branch in which a photovoltaic unit 101a2 is located, the current detection direction of the point G is opposite to the preset direction.

In this manner, the current directions of the point G and the point H may be separately detected by using two current sensors.

In some embodiments, a direct connection may be performed instead of disposing protection switches S1, S2, and S3. In this case, the controller controls a protection switch to be open, so that a current flowing to a short-circuit branch is less than a first current value, thereby protecting a photovoltaic unit and a line.

Figure 12:
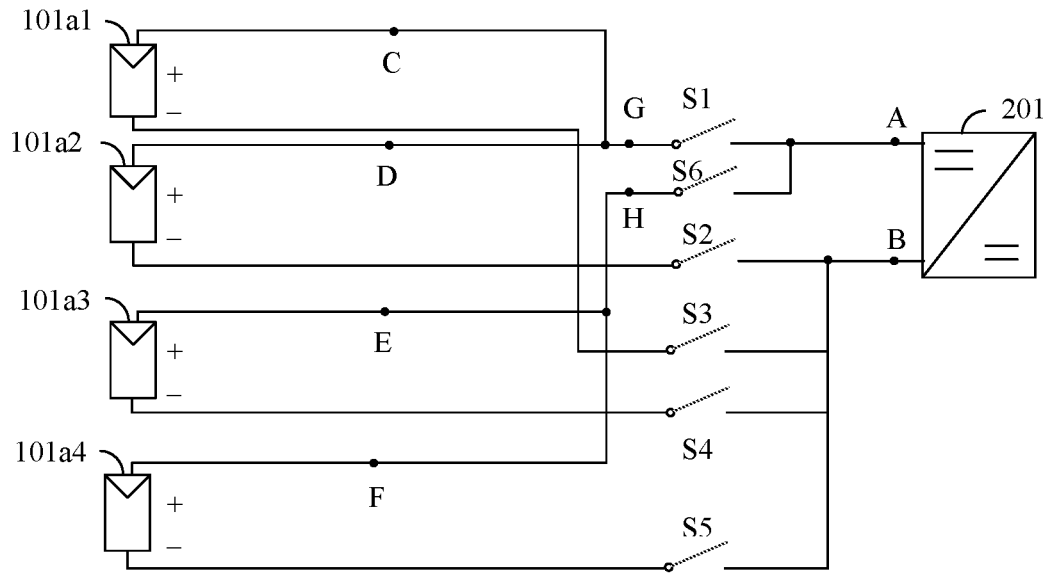
FIG. 12 is a schematic diagram of yet another protection apparatus according to an embodiment of this application.

FIG. 12 is a schematic diagram of yet another protection apparatus according to an embodiment of this application.

FIG. 12 shows another possible implementation, and the implementation differs from the manner shown in FIG. 11 in that a positive output end of the photovoltaic unit 101a1 and a positive output end of the photovoltaic unit 101a2 are aggregated at the protection switch S1, and are connected to a positive direct current bus by using the protection switch S1; and a positive output end of the photovoltaic unit 101a3 and a positive output end of the photovoltaic unit 101a4 are aggregated at a protection switch S6, and are connected to the positive direct current bus by using the protection switch S6.

In this case, the controller may use the working principle corresponding to FIG. 11. Details are not described again in this embodiment of this application.

Figure 13:
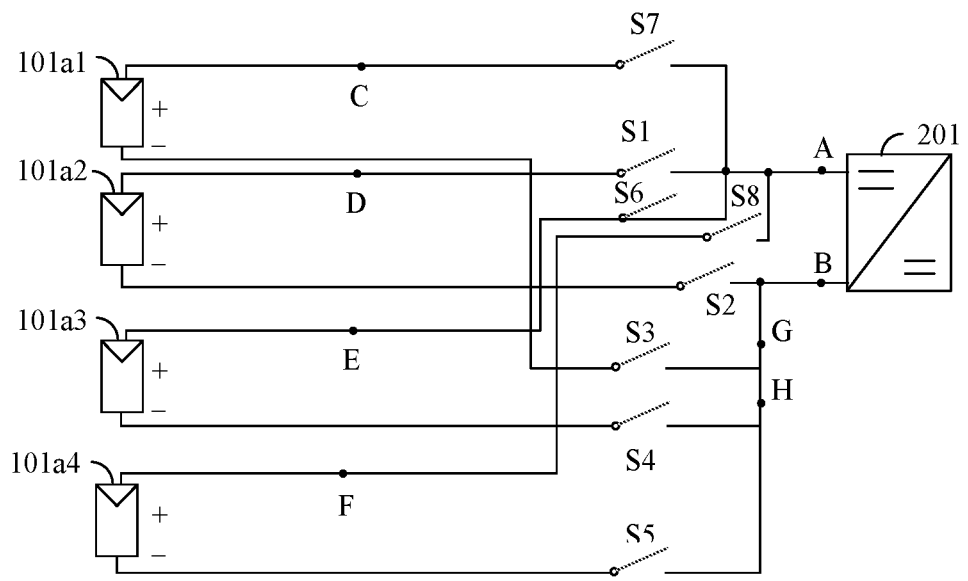
FIG. 13 is a schematic diagram of another protection apparatus according to an embodiment of this application.

FIG. 13 is a schematic diagram of another protection apparatus according to an embodiment of this application.

FIG. 13 shows another possible implementation, and the implementation differs from the manner shown in FIG. 11 in that a positive output end of each photovoltaic unit and one protection switch are connected in series and are aggregated at a positive direct current bus, and a negative output end of each photovoltaic unit and one protection switch are connected in series and are then aggregated at a negative direct current bus. Redundantly disposing the protection switch can further improve safety and ensure that a branch in which a photovoltaic unit is located can be disconnected.

In this case, the controller may use the working principle corresponding to FIG. 11. Details are not described again in this embodiment of this application.

It may be understood that the detection points C, D, E, and F in the foregoing embodiment may be alternatively located on negative output end sides of corresponding photovoltaic units.

When the protection apparatus is connected to four photovoltaic units via an interface, when an absolute value of a current of a branch is greater than the absolute value of the current of the direct current bus, or when a current direction of a photovoltaic unit is opposite to a preset current direction, the controller of the protection apparatus can control the protection switch to be open, so that a current of any branch is less than the first current value, thereby protecting a photovoltaic unit and a line. In addition, because only the protection switch is added to a circuit, and the protection switch has a smaller resistance than a fuse, a loss rate and a loss are further reduced. In addition, a Y terminal may also be disposed on a photovoltaic unit side, so that cable costs are reduced.

Apparatus Embodiment 6

Figure 14:
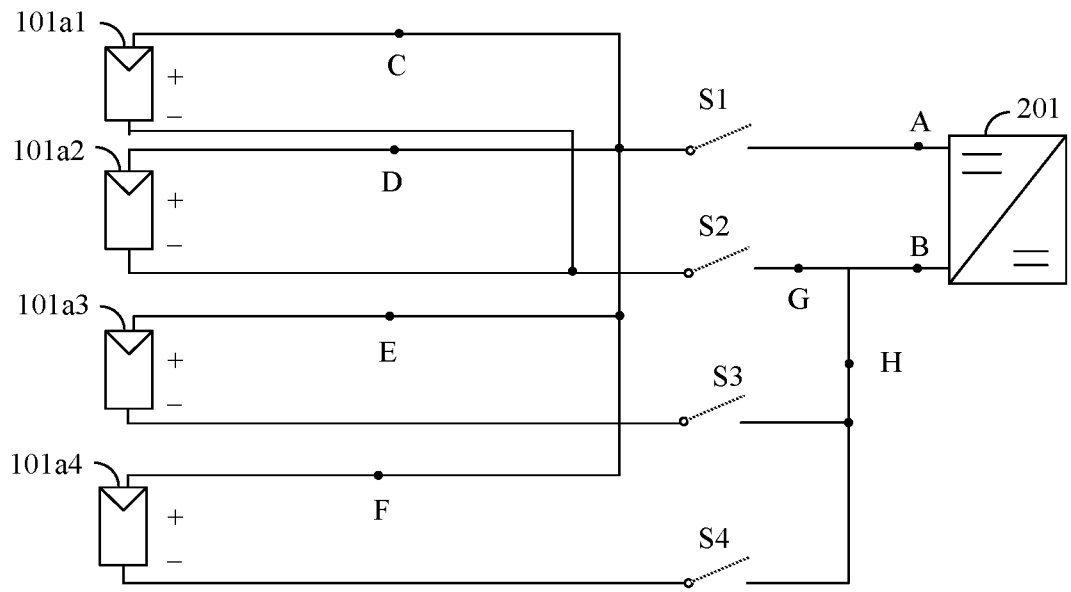
FIG. 14 is a schematic diagram of still another protection apparatus according to an embodiment of this application.

FIG. 14 is a schematic diagram of still another protection apparatus according to an embodiment of this application.

Photovoltaic units 101a1 and 101a2 are connected in parallel and are then connected to a direct current bus of the apparatus, and a branch in which each of photovoltaic units 101a3 and 101a4 is located and one protection switch are connected in series and are then connected to the direct current bus of the apparatus.

Specifically, positive output ends of two first-type photovoltaic unit branches are aggregated and are then connected to a positive direct current bus, a negative output end of each of the two first-type photovoltaic unit branches and one protection switch are connected in series and are then aggregated and connected to a negative direct current bus.

Positive output ends of the photovoltaic units 101a1 and 101a2 are connected to the positive direct current bus via a protection switch S1, and negative output ends of the photovoltaic units 101a1 and 101a2 are connected to the negative direct current bus via a protection switch S2.

In some embodiments, a direct connection may be performed instead of disposing the protection switches S1 and S2.

The following describes a principle of implementing a protection function by a controller by using an absolute value of a detection current.

When there is no short-circuit fault, currents of all branches are aggregated into the direct current bus, and therefore an absolute value of a current of the direct current bus (an absolute value of a detection current of a detection point A or B) is greater than an absolute value of a current of any branch (absolute values of detection currents of detection points C, D, E, F, G, and H).

When a short-circuit fault occurs in a branch, an output current of a normal branch flows to the short-circuit branch. In this case, the absolute value of the current of the direct current bus is less than an absolute value of a current of any branch.

Therefore, when an absolute value of a current of a branch is greater than the absolute value of the current of the direct current bus, the controller of the apparatus controls protection switches S1 to S4 to be open, so that a current flowing to the faulty branch is zero, thereby protecting a photovoltaic unit and a line.

In this implementation, the absolute value of the current of the direct current bus, namely, the point A or the point B, may be detected by using a first current sensor, and an absolute value of a current of any one of C, D, E, F, G, and H may be detected by using a second current sensor.

The following describes a principle of implementing a protection function by a controller by using a direction of a detection current.

When there is no short-circuit fault, current directions of a detection point G and a detection point H may be set to a preset direction, for example, may be set to a positive direction.

When a short-circuit fault occurs in branches in which the photovoltaic units 101a3 and 101a4 are located, the current direction of the point H is opposite to the preset direction.

When a short-circuit fault occurs in branches in which the photovoltaic units 101a1 and 101a2 are located, the current direction of the point G is opposite to the preset direction. Therefore, when a current detection direction of either of the point H and the point G is opposite to the preset current direction, the controller may determine that a short-circuit fault occurs and control protection switches S1 to S4 to be open, so that a current flowing to the faulty branch is zero, thereby protecting the photovoltaic unit and a line.

In this implementation, the current directions of the point G and the point H may be separately detected by using two current sensors.

In some embodiments, a direct connection may be performed instead of disposing the protection switches S1, S3, and S4. In this case, the controller controls the protection switch to be open, so that a current flowing to a short-circuit branch is less than a first current value, thereby protecting a photovoltaic unit and a line.

Figure 15:
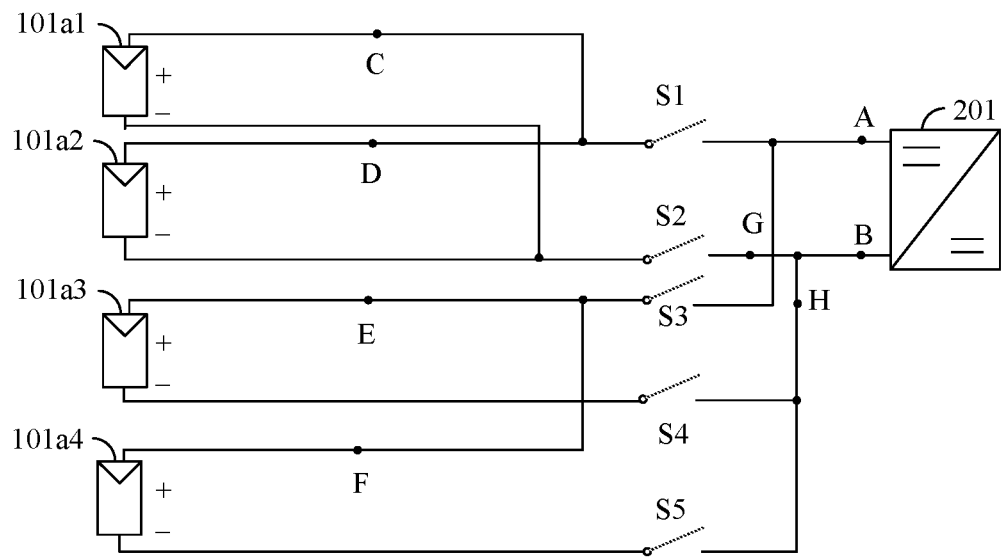
FIG. 15 is a schematic diagram of yet another protection apparatus according to an embodiment of this application.

FIG. 15 is a schematic diagram of yet another protection apparatus according to an embodiment of this application.

An implementation shown in FIG. 15 is different from that in FIG. 14 in that positive output ends of the photovoltaic units 101a3 and 101a4 are aggregated and are then connected to the positive direct current bus via the protection switch S3, a negative output end of the photovoltaic unit 101a3 is connected to the negative direct current bus via the protection switch S4, and a negative output end of the photovoltaic unit 101a4 is connected to the negative direct current bus via a protection switch S5.

In this case, the controller may use the working principle corresponding to FIG. 14 to protect a photovoltaic unit and a line. Details are not described again in this embodiment of this application.

Figure 16:
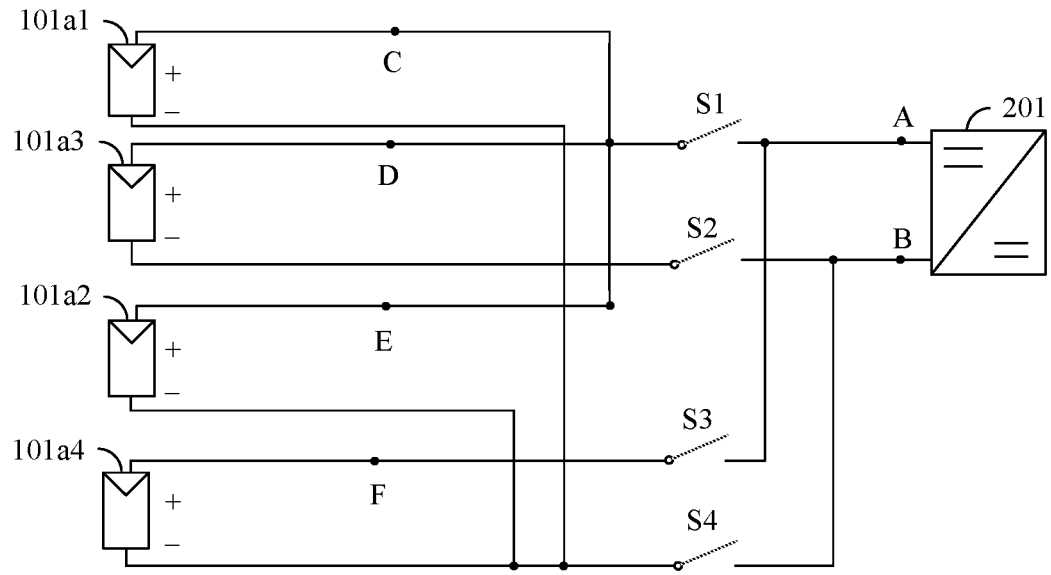
FIG. 16 is a schematic diagram of another protection apparatus according to an embodiment of this application.

FIG. 16 is a schematic diagram of another protection apparatus according to an embodiment of this application.

An implementation shown in FIG. 16 differs from that in FIG. 14 in that the photovoltaic units 101a1 and 101a2 are connected in parallel, the positive output ends of the photovoltaic units 101a1 and 101a2 are aggregated and are then connected to the positive direct current bus via the protection switch S1, the negative output ends of the photovoltaic units 101a1 and 101a2 are connected to the negative direct current bus via the protection switch S4, the positive output end of the photovoltaic unit 101a3 is connected to the positive direct current bus, the negative output end of the photovoltaic unit 101a3 is connected to the negative direct current bus via the protection switch S2, the positive output end of the photovoltaic unit 101a4 is connected to the positive direct current bus via the protection switch S3, and the negative output end of the photovoltaic unit 101a4 is connected to the negative direct current bus via the protection switch S4.

In this case, the controller may use the working principle corresponding to FIG. 14 to protect a photovoltaic unit and a line. Details are not described again in this embodiment of this application.

The detection points C, D, E, and F in the foregoing embodiment may be alternatively located on negative output end sides of corresponding photovoltaic units.

When the protection apparatus is connected to four photovoltaic units via an interface, when an absolute value of a current of any branch is greater than the absolute value of the current of the direct current bus, or when a current direction of any branch is opposite to a preset current direction, the controller of the protection apparatus can control the protection switch to be open, so that a current of any branch is less than the first current value, thereby protecting a photovoltaic unit and a line. In addition, because only the protection switch is added to a circuit, and the protection switch has a smaller resistance than a fuse, a loss rate and a loss are further reduced. In addition, a Y terminal may also be disposed on a photovoltaic unit side, so that cable costs are reduced.

Apparatus Embodiment 7

Figure 17:
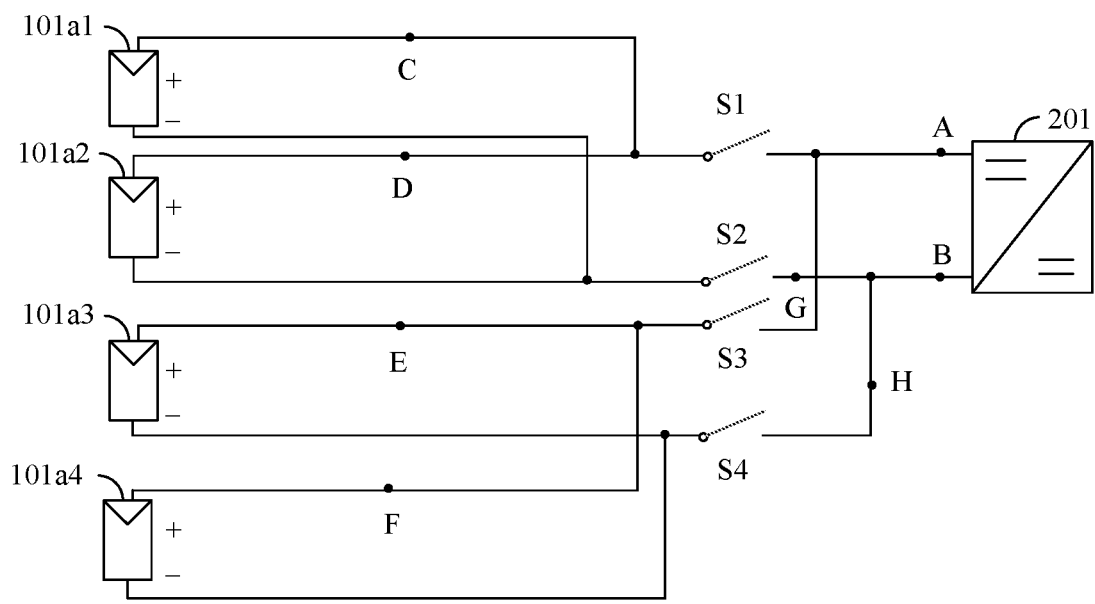
FIG. 17 is a schematic diagram of still another protection apparatus according to an embodiment of this application.

FIG. 17 is a schematic diagram of still another protection apparatus according to an embodiment of this application.

Photovoltaic units 101*a*1 and 101*a*2 are directly connected in parallel inside the apparatus. Positive output ends of the photovoltaic units 101*a*1 and 101*a*2 are connected to a positive direct current bus via a protection switch S1, and negative output ends are connected to a negative direct current bus via a protection switch S2. Photovoltaic units 101*a*3 and 101*a*4 are directly connected in parallel inside the apparatus. Positive output ends of the photovoltaic units 101*a*3 and 101*a*4 are connected to the positive direct current bus via a protection switch S3, and negative output ends are connected to the negative direct current bus via a protection switch S4.

The following describes a principle of implementing a protection function by a controller by using an absolute value of a detection current.

When there is no short-circuit fault, currents of all branches are aggregated into the direct current bus, and therefore an absolute value of a current of the direct current bus (an absolute value of a detection current of a detection point A or B) is greater than an absolute value of a current of any branch (absolute values of detection currents of detection points C, D, E, F, G, and H).

When a short-circuit fault occurs in a branch, an output current of a normal branch flows to the branch in which a short-circuit fault occurs. In this case, the absolute value of the current of the direct current bus is less than an absolute value of a current of any branch.

In this implementation, the absolute value of the current of the direct current bus, namely, the point A or the point B, may be detected by using a current sensor, and an absolute value of a current of any one of C, D, E, F, G, and H may be detected by using another current sensor.

The following describes a principle of implementing a protection function by a controller by using a direction of a detection current.

When there is no short-circuit fault, current directions of a point G and a point H may be set to a preset direction, for example, may be set to a positive direction.

When a short-circuit fault occurs in branches in which the photovoltaic units 101*a*1 and 101*a*2 are located, the current direction of the point G is opposite to the preset current direction. When a short-circuit fault occurs in branches in which the photovoltaic units 101*a*3 and 101*a*4 are located, the current direction of the point H is opposite to the preset current direction. Therefore, when a current detection direction of either of the point G and the point H is opposite to the preset current direction, the controller may determine that a short-circuit fault occurs and control the protection switches S1 to S4 to be open, so that a current flowing to the faulty branch is zero, thereby protecting the photovoltaic unit and a line.

In some embodiments, a direct connection may be performed instead of disposing at least one of the protection switches S1 and S2, or a direct connection may be performed instead of disposing at least one of the protection switches S3 and S4, or a direct connection may be performed instead of disposing either of the protection switches S1 and S2 and either of the protection switches S3 and S4, to reduce a quantity of protection switches connected in series, thereby reducing costs. In this case, the controller controls remaining protection switches to be open, so that a current flowing to a branch in which a short-circuit fault occurs can be less than a first current value, thereby protecting a photovoltaic unit and a line.

When the protection apparatus is connected to four photovoltaic units via an interface, when an absolute value of a current of a branch is greater than the absolute value of the current of the direct current bus, or when a current direction of a branch is opposite to a preset current direction, the controller of the protection apparatus can control the protection switch to be open, so that a current of any branch is less than the first current value, thereby protecting a photovoltaic unit and a line. In addition, because only the protection switch is added to a circuit, and the protection switch has a smaller resistance than a fuse, a loss rate and a loss are further reduced. In addition, a Y terminal may also be disposed on a photovoltaic unit side, so that cable costs are reduced.

The foregoing embodiments describe working principles of the controller when the protection apparatus is connected to three photovoltaic units and four photovoltaic units. In some embodiments, each apparatus may be alternatively correspondingly connected to more photovoltaic units. The following describes in detail a working principle of the controller when each apparatus is connected to more than four photovoltaic units.

Apparatus Embodiment 8

For example, a protection apparatus is connected to M first-type photovoltaic unit branches in parallel via an interface. M is an integer greater than or equal to 3, a maximum of j photovoltaic units are directly connected to a direct current bus inside the apparatus, and each other photovoltaic unit and at least one protection switch are separately connected in series and are then connected to the direct current bus in parallel.

When the photovoltaic unit is connected to one protection switch in series, the protection switch is connected to a positive output end or a negative output end of the photovoltaic unit in series. When the photovoltaic unit is connected to two protection switches in series, the protection switches are connected to a positive output end and a negative output end of the photovoltaic unit in series to implement redundancy protection.

When a short-circuit fault occurs in a single photovoltaic unit, when the faulty photovoltaic unit can tolerate an output current of one other normal photovoltaic unit, a value of j is 0, 1, or 2; or when the faulty photovoltaic unit can tolerate output currents of two other normal photovoltaic units, a value of j is 0, 1, 2, or 3.

The following describes an example in which j is 2.

Figure 18:
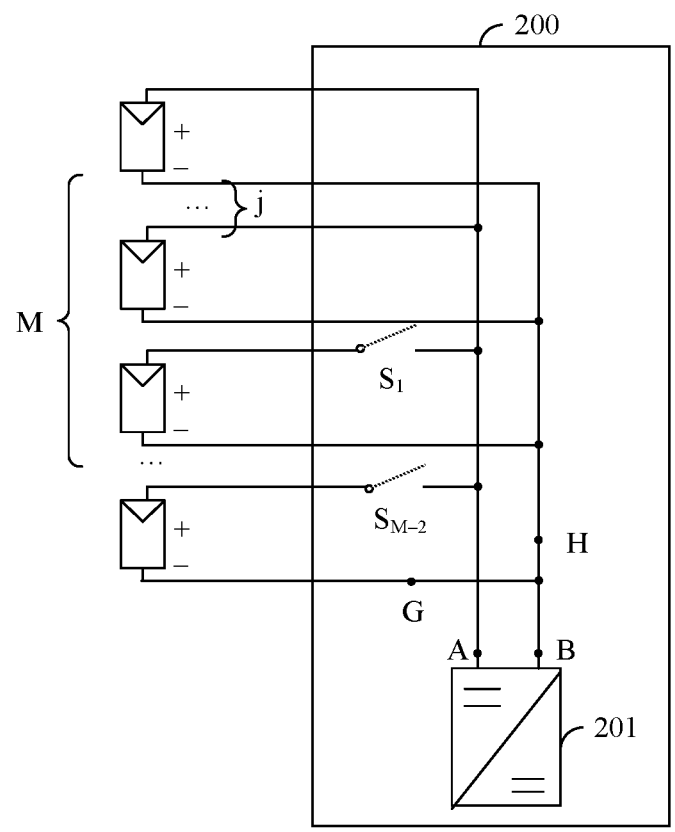
FIG. 18 is a schematic diagram of yet another protection apparatus according to an embodiment of this application.

FIG. 18 is a schematic diagram of yet another protection apparatus according to an embodiment of this application.

Two photovoltaic units are directly connected to a direct current bus in parallel, and each of other (M−2) photovoltaic units and one protection switch are connected in series and are then connected to the direct current bus in parallel.

The following describes a principle of implementing a protection function by a controller by using an absolute value of a detection current.

When there is no short-circuit fault, currents of all photovoltaic units are aggregated into the direct current bus, and an absolute value of a current of the direct current bus (an absolute value of a detection current of a detection point A or a detection point B) is greater than an absolute value of a current of any branch.

When a short-circuit fault occurs in a photovoltaic unit, output currents of other normal photovoltaic units flow to a branch in which the short-circuit photovoltaic unit is located. In this case, the absolute value of the current of the direct current bus is less than an absolute value of a current of a branch in which any photovoltaic unit is located.

When an absolute value of a current of a branch is greater than the absolute value of the current of the direct current bus, the controller of the apparatus 200 controls protection switches $S_1$ to $S_{M-2}$ to be open, so that a current of any branch is less than a first preset current, thereby protecting a photovoltaic unit and a line.

In the foregoing implementation, the absolute value of the current of the point A or the point B may be detected by using a first current sensor, and an absolute value of a current of any branch may be detected by using a second current sensor.

The following describes a principle of implementing a protection function by a controller by using a direction of a detection current.

When there is no short-circuit fault, current directions of a detection point G and a detection point H may be set to a preset direction, for example, may be set to a positive direction.

The point G may be located at a positive output end or a negative output end of any branch, and positive output ends of all branches other than the branch in which the point G is located are aggregated at the point H, or negative output ends of all branches other than the branch in which the point G is located are aggregated at the point H.

When a short-circuit fault occurs in the branch in which the point G is located, currents of all other branches flow to the branch in which the point G is located, and in this case, the current detection direction of the point G is opposite to the preset direction. When the branch in which the point G is located is normal and a short-circuit fault occurs in another branch, the branch in which the point G is located outputs a current to the branch in which a short-circuit fault occurs, and in this case, the current detection direction of the point H is opposite to the preset current direction. Therefore, when the current detection direction of the point G or the point H is opposite to the preset direction, the controller determines that a short-circuit fault occurs, and the controller controls all of protection switches $S_1$ to $S_{M-2}$ to be open, so that a current of any branch is less than a first current value, thereby protecting a photovoltaic unit and a line.

In this manner, the current direction of the point G may be detected by using a third current sensor, and the current direction of the point H may be detected by using a fourth current sensor.

In some embodiments, the protection switches $S_1$ to $S_{M-2}$ may be alternatively connected to negative output ends of corresponding photovoltaic units, or one protection switch is connected to each of a positive output end and a negative output end of a photovoltaic unit in series. Redundantly disposing the protection switch can improve fault tolerance.

In some embodiments, at least one protection switch may be alternatively connected to each of all first-type photovoltaic unit branches in series. In this case, the controller controls the protection switch to be open, so that a current of any branch is zero.

When the protection apparatus is connected to at least three photovoltaic unit branches via the interface, when an absolute value of a current of any branch is greater than the absolute value of the current of the direct current bus, or when a current direction of a branch is opposite to a preset current direction, the controller of the protection apparatus can control the protection switch to be open, so that a current of any branch is less than the first current value, thereby protecting a photovoltaic unit and a line. In addition, because only the protection switch is added to a circuit, and the protection switch has a smaller resistance than a fuse, a loss rate and a loss are further reduced. In addition, a Y terminal may also be disposed on a photovoltaic unit side, so that cable costs are reduced.

Apparatus Embodiment 9

Figure 19:
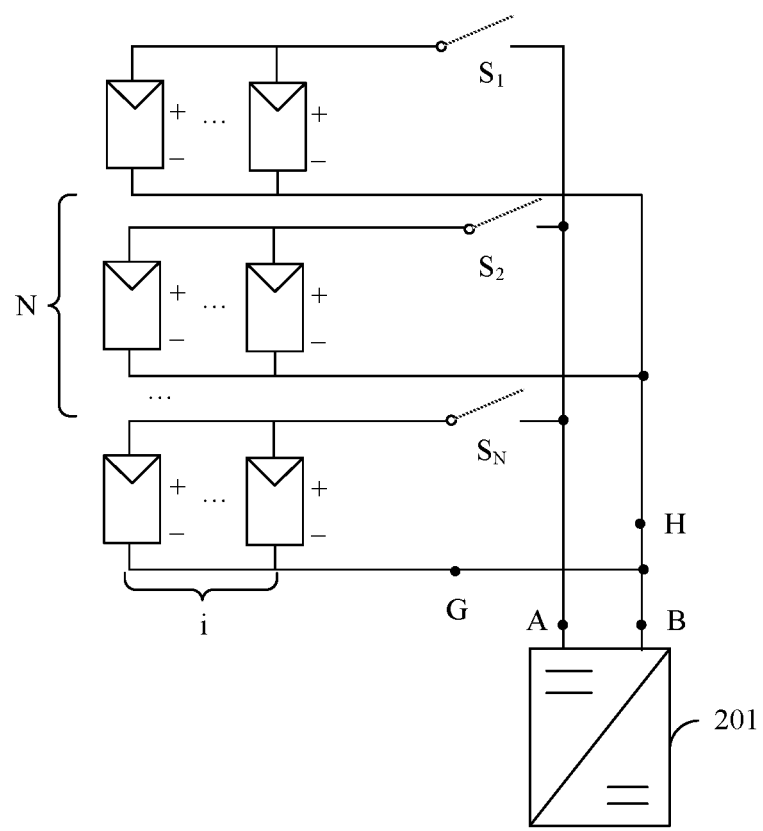
FIG. 19 is a schematic diagram of another protection apparatus according to an embodiment of this application.

FIG. 19 is a schematic diagram of another protection apparatus according to an embodiment of this application.

Each i photovoltaic unit is directly connected in parallel inside the apparatus and is connected to a direct current bus of the apparatus after being connected to at least one protection switch in series, where i is an integer greater than or equal to 2.

When a short-circuit fault occurs in a single photovoltaic unit, when the faulty photovoltaic unit can tolerate an output current of one other normal photovoltaic unit, a value of i is 2; or when the faulty photovoltaic unit can tolerate output currents of two other normal photovoltaic units, a value of i is 2 or 3.

The following describes a principle of implementing a protection function by a controller by using an absolute value of a detection current.

When there is no short-circuit fault, currents of all branches are aggregated into the direct current bus, and an absolute value of a current of the direct current bus (an absolute value of a detection current of a detection point A or a detection point B) is greater than an absolute value of a current of any branch.

When a short-circuit fault occurs in a photovoltaic unit, output currents of other normal photovoltaic units flow to a branch in which the short-circuit photovoltaic unit is located. In this case, the absolute value of the current of the direct current bus is less than an absolute value of a current of any branch.

When an absolute value of a current of a branch is greater than the absolute value of the current of the direct current bus, the controller of the protection apparatus controls protection switches $S_1$ to $S_N$ to be open, so that a current of any branch is less than a first preset current, thereby protecting a photovoltaic unit and a line.

In the foregoing implementation, the absolute value of the current of the point A or the point B may be detected by using a first current sensor, and an absolute value of a current of any branch may be detected by using a second current sensor.

The following describes a principle of implementing a protection function by a controller by using a direction of a detection current.

When there is no short-circuit fault, current directions of a detection point G and a detection point H may be set to a preset direction, for example, may be set to a positive direction.

The point G may be located at a positive output end or a negative output end of any branch, and positive output ends of all branches other than the branch in which the point G is located are aggregated at the point H, or negative output ends of all branches other than the branch in which the point G is located are aggregated at the point H.

When a short-circuit fault occurs in the branch in which the point G is located, currents of all other branches flow to the branch in which the point G is located, and in this case, the current detection direction of the point G is opposite to the preset direction. When the branch in which the point G is located is normal and a short-circuit fault occurs in another branch, the branch in which the point G is located outputs a current to the branch in which a short-circuit fault occurs, and in this case, the current detection direction of the point H is opposite to the preset current direction. Therefore, when the current detection direction of the point G or the point H is opposite to the preset direction, the controller determines that a short-circuit fault occurs, and the controller controls all of the protection switch $S_1$ to $S_N$ to be open, so that a photovoltaic unit and a line are protected.

In this manner, the current direction of the point G may be detected by using a third current sensor, and the current direction of the point H may be detected by using a fourth current sensor.

In some embodiments, the protection switches $S_1$ to $S_N$ may be alternatively connected to negative output ends of corresponding branches, or one protection switch is connected to each of a positive output end and a negative output end of a corresponding branch in series. Redundantly disposing the protection switch can improve fault tolerance.

When the protection apparatus is connected to at least two photovoltaic units via an interface, when an absolute value of a current of any branch is greater than the absolute value of the current of the direct current bus, or when a current direction of a branch is opposite to a preset current direction, the controller of the protection apparatus can control the protection switch to be open, so that a current of any branch is less than the first current value, thereby protecting a photovoltaic unit and a line. In addition, because only the protection switch is added to a circuit, and the protection switch has a smaller resistance than a fuse, a loss rate and a loss are further reduced. In addition, a Y terminal may also be disposed on a photovoltaic unit side, so that cable costs are reduced.

Apparatus Embodiment 10

Figure 20A:
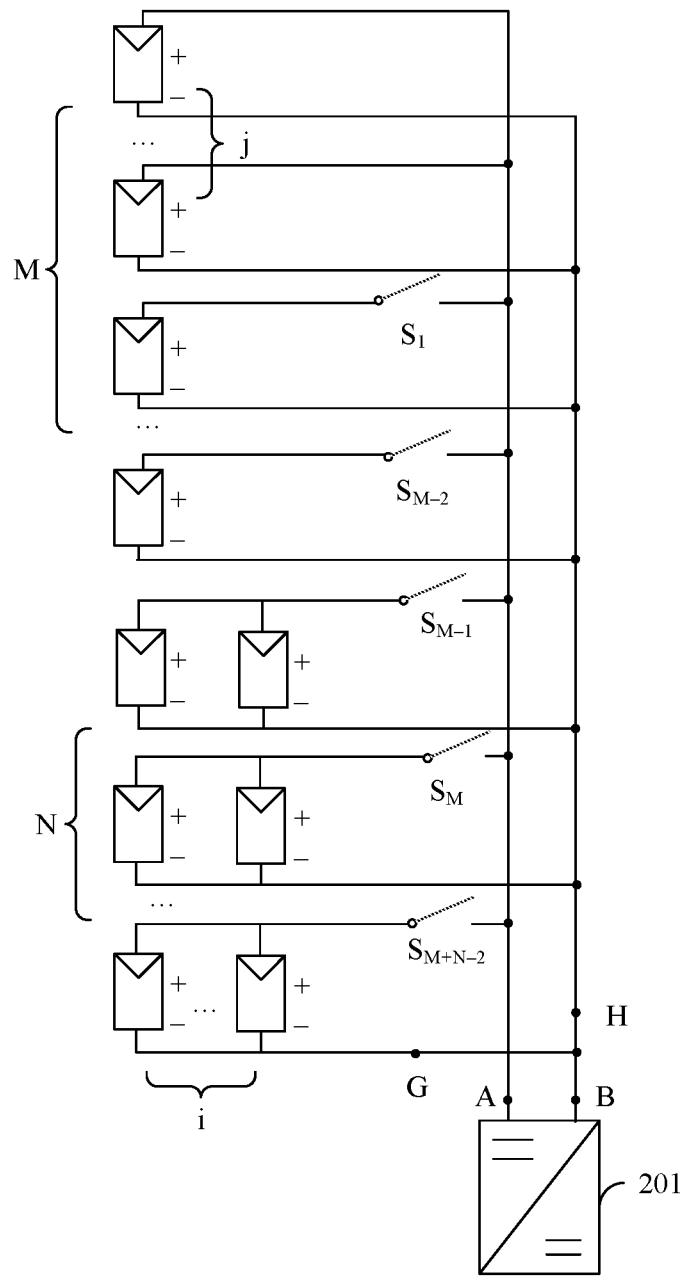
FIG. 20A is a schematic diagram of still another protection apparatus according to an embodiment of this application.

FIG. 20A is a schematic diagram of still another protection apparatus according to an embodiment of this application.

A maximum of j photovoltaic units are directly connected to a direct current bus inside the apparatus, and (M−j) photovoltaic units and at least one switch are connected in series inside the apparatus and are then connected to the direct current bus. A maximum of i photovoltaic units are directly connected in parallel inside the apparatus and are connected to the direct current bus of the apparatus after being connected to at least one protection switch in series, where N is an integer greater than or equal to 2.

When a short-circuit fault occurs in a single photovoltaic unit, when the faulty photovoltaic unit can tolerate an output current of one other normal photovoltaic unit, a value of i is 2, and a value of j may be 0, 1, or 2; or when the faulty photovoltaic unit can tolerate output currents of two other normal photovoltaic units, a value of i is 2 or 3, and a value of j is 0, 1, 2, or 3.

In this case, to enable a current of any branch to be less than a maximum current value that can be tolerated by a photovoltaic unit and a line when a short-circuit fault occurs, (M+N−2) protection switches are required, so that a short-circuit current of any branch does not damage the photovoltaic unit and the line.

The following describes a principle of implementing a protection function by a controller by using an absolute value of a detection current.

When there is no short-circuit fault, currents of all branches are aggregated into the direct current bus, and therefore an absolute value of a current of the direct current bus (an absolute value of a detection current of a point A or a point B) is greater than an absolute value of a current of any branch. When a short-circuit fault occurs in any branch, output currents of all other normal branches flow to the branch in which a short-circuit fault occurs. In this case, no current flows to the direct current bus, in other words, the absolute value of the current of the direct current bus is less than an absolute value of a current of any branch.

To reduce a quantity of used current sensors, the foregoing implementation may be implemented by using two current sensors. One current sensor detects the absolute value of the current of the direct current bus, namely, the point A or the point B, and the other current sensor detects an absolute value of a current of any branch.

When the absolute value of the current of the direct current bus is less than an absolute value of a current of a branch, the controller controls all of protection switches S1 to $S_{M+N-2}$ to be open, so that a current of any branch is less than a first current value.

The following describes a principle of implementing a protection function by a controller by using a direction of a detection current.

When there is no short-circuit fault, a current direction of a detection point G or H may be set to a preset direction, for example, may be set to a positive direction.

When a short-circuit fault occurs in a branch in which the point G is located, currents of all other branches flow to the branch in which the point G is located, and in this case, the current detection direction of the point G is opposite to the preset direction. When a branch in which the point G is located is normal and a short-circuit fault occurs in another branch, the branch in which the point G is located outputs a current to the branch in which a short-circuit fault occurs, and in this case, the current detection direction of the point H is opposite to the preset current direction. Therefore, when the current detection direction of the point G or the point H is opposite to the preset direction, the controller determines that a short-circuit fault occurs, and the controller controls all of protection switches $S_1$ to $S_{M+N-2}$ to be open, so that a current of any branch is less than a first current value, thereby protecting a photovoltaic unit and a line.

The point G may be located in any branch, and positive output ends of all branches other than the branch in which the point G is located are aggregated at the point H, or negative output ends of all branches other than the branch in which the point G is located are aggregated at the point H.

In some embodiments, the protection switches $S_1$ to $S_{M-2}$ may be alternatively connected to negative output ends of corresponding photovoltaic units, or one protection switch is connected to each of a positive output end and a negative output end of a photovoltaic unit in series. Redundantly disposing the protection switch can improve fault tolerance.

In some embodiments, at least one protection switch may be alternatively connected to each of M photovoltaic unit branches shown in the figure in series. In this case, the controller controls the protection switch to be open, so that a current of any branch is zero.

In some embodiments, protection switches $S_{M-1}$ to $S_{M+N-2}$ may be alternatively connected to negative output ends of corresponding branches, or one protection switch is connected to each of a positive output end and a negative output end of a second-type photovoltaic unit branch in series. Redundantly disposing the protection switch can improve fault tolerance.

When the protection apparatus is connected to a plurality of photovoltaic units via an interface, where the connection to the plurality of photovoltaic units may be implemented by using a combination of a plurality of manners, when an absolute value of a current of any branch is greater than the absolute value of the current of the direct current bus, or when a current direction of any branch is opposite to a preset current direction, the controller of the protection apparatus can control the protection switch to be open, so that a current of any branch is less than the first current value, thereby protecting a photovoltaic unit and a line. In addition, because only the protection switch is added to a circuit, and the protection switch has a smaller resistance than a fuse, a loss rate and a loss are further reduced. In addition, a Y terminal may also be disposed on a photovoltaic unit side, so that cable costs are reduced.

Figure 20B:
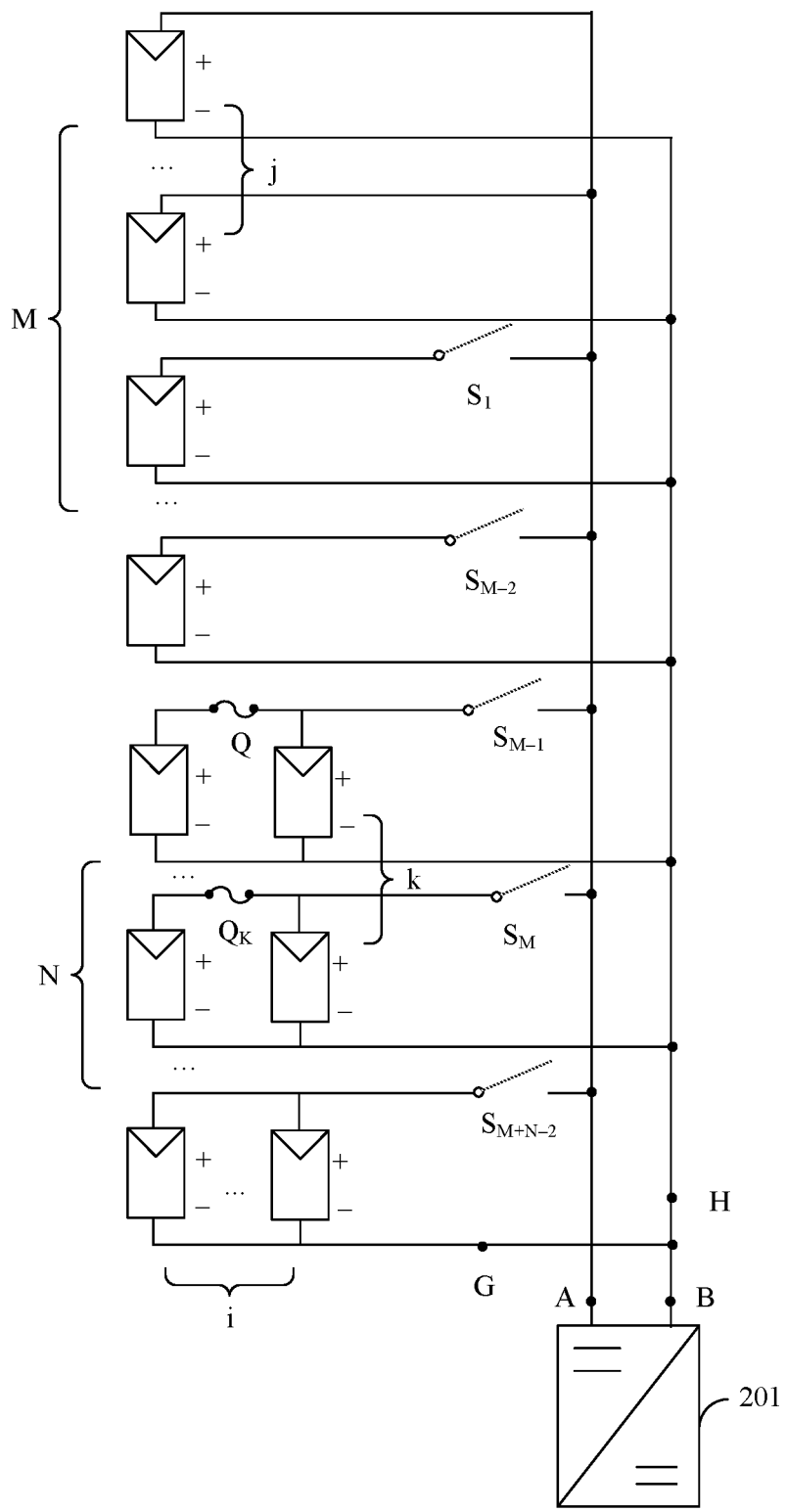
FIG. 20B is a schematic diagram of yet another protection apparatus according to an embodiment of this application.

Further, refer to FIG. 20B. FIG. 20B is a schematic diagram of yet another protection apparatus according to an embodiment of this application.

A photovoltaic unit and a protection unit are allowed to connect to the apparatus after being connected in series or in parallel. The figure describes an example in which every two of i photovoltaic units are connected in parallel via the protection unit. In some embodiments, the protection unit may be alternatively connected to the photovoltaic unit in series. For example, the protection unit may be disposed at a location of a point G in the figure.

A protection unit Q may be one or a combination of a fuse, an optimizer, and a disconnection box, or may be another component that can protect a circuit when a short-circuit fault occurs in the circuit. This is not specifically limited in this embodiment of this application.

A value of k in the figure may be determined based on an actual case, and this is not specifically limited in this embodiment of this application.

In this case, the protection switch is further configured to: when being open, prevent the protection unit from triggering a protection action. In other words, when a photovoltaic power generation system that currently uses the protection unit is reconstructed, the protection unit may not need to be dismantled, so that the protection unit is directly connected to the open-circuit protection apparatus.

It should be noted that when a short-circuit fault occurs in a single photovoltaic unit, when the faulty photovoltaic unit can tolerate an output current of one other normal photovoltaic unit, to avoid triggering the protection action of the protection unit, a value of i is 2; or when the faulty photovoltaic unit can tolerate output currents of two other normal photovoltaic units, to avoid triggering the protection action of the protection unit, a value of i is 2 or 3.

The foregoing embodiment describes a working principle of the controller of the protection apparatus when a short-circuit fault occurs in a photovoltaic unit or a line in which a photovoltaic unit is located. The following describes a working principle of the controller when a positive electrode and a negative electrode are short circuited or a direct current bus is short circuited inside the protection apparatus or a direct current bus in a next circuit is short circuited.

Figure 20C:
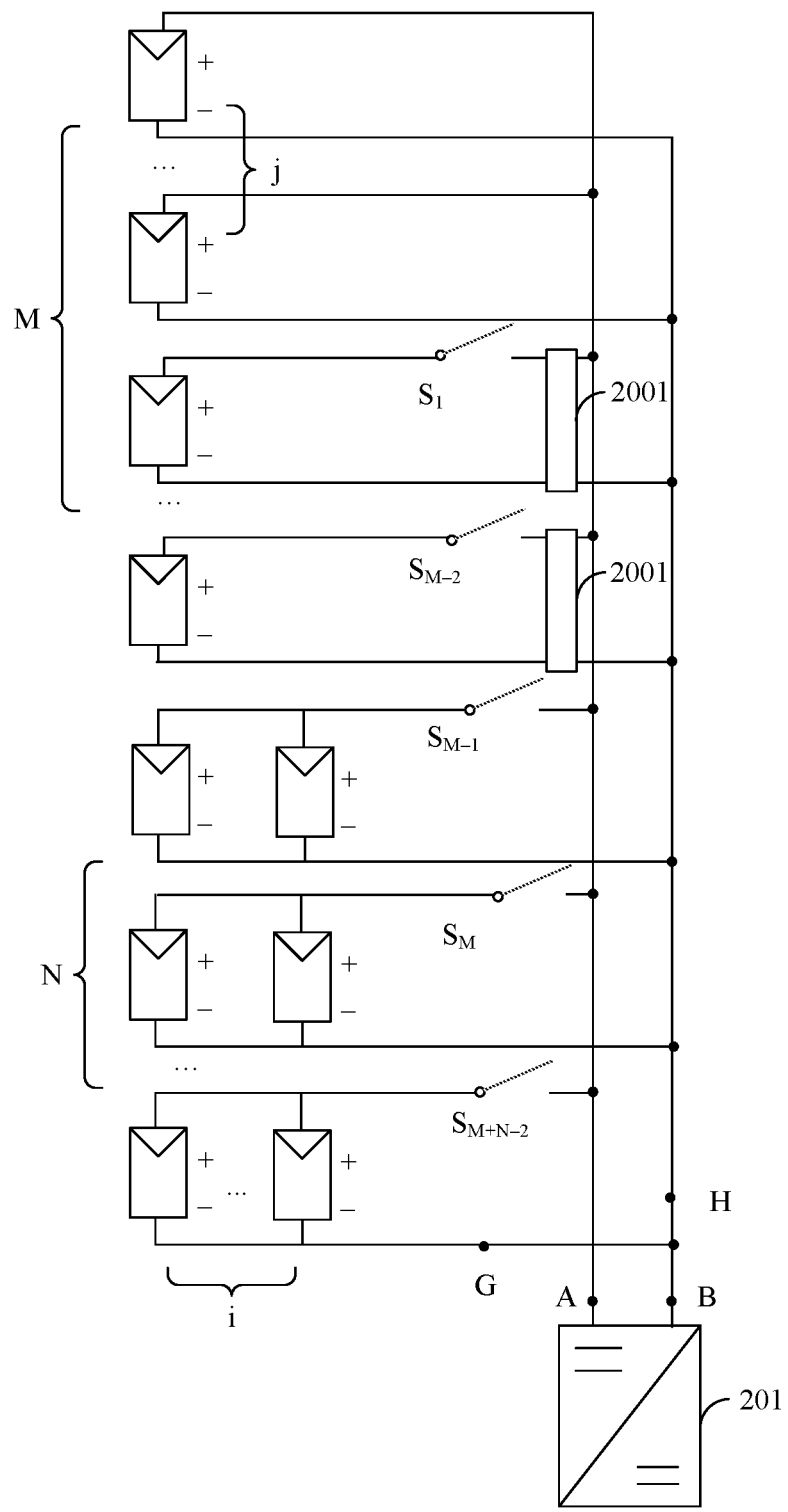
FIG. 20C is a schematic diagram of yet another protection apparatus according to an embodiment of this application.

In some other embodiments, refer to FIG. 20C. In this case, the apparatus further includes a power converter 2001. Some or all of photovoltaic units are coupled to the direct current bus via the power converter 2001. The power converter 2001 is a direct current/direct current converter, for example, a boost circuit, configured to perform boost conversion on a direct current.

Apparatus Embodiment 11

Figure 21:
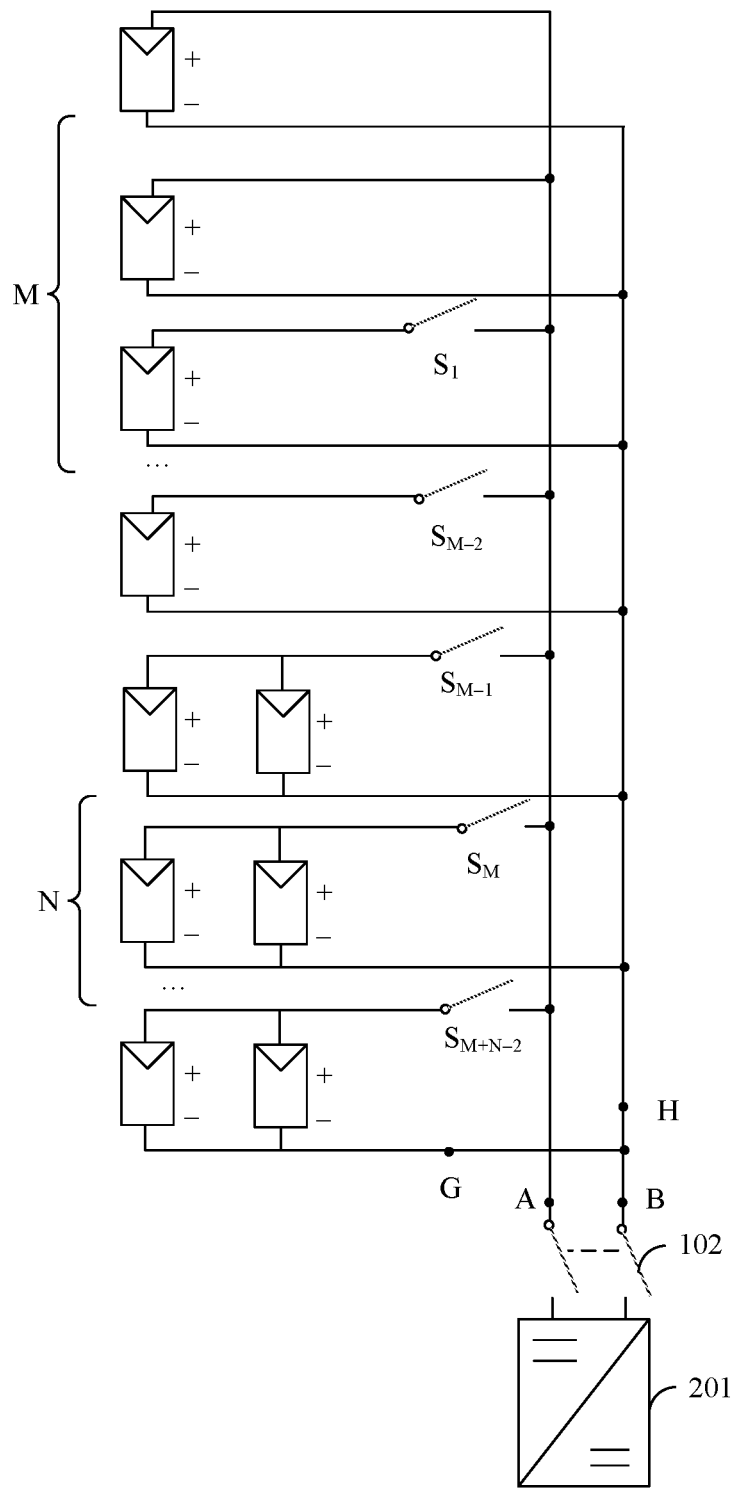
FIG. 21 is a schematic diagram of another protection apparatus according to an embodiment of this application.

FIG. 21 is a schematic diagram of another protection apparatus according to an embodiment of this application.

An implementation shown in FIG. 21 differs from that in FIG. 20 in that direct current switches 102 disposed on a positive direct current bus and a negative direct current bus are further included.

When a positive electrode and a negative electrode are short circuited or a direct current bus is short circuited inside the protection apparatus or a direct current bus in a next circuit is short circuited, in other words, short-circuiting occurs between the positive direct current bus and the negative direct current bus in which a point A and a point B are located, a voltage of the direct current bus decreases, and a current of the direct current bus increases. Therefore, the point A or the point B may be used as a detection point. When an absolute value of a voltage of the detection point is less than a first voltage value and an absolute value of a current of the detection point is greater than a second current value, a controller controls the direct current switch 102 to be open to cut off a short-circuit current.

When the controller implements a protection function by using an absolute value of a detection current, a current sensor that can measure an absolute value of a current of the point A or the point B exists in a direct current branch, and in this case, only a voltage sensor needs to be added to measure an absolute value of a voltage of the point A or the point B.

When the controller implements a protection function by using a direction of a detection current, a current sensor (namely, a fifth current sensor) needs to be added to measure an absolute value of a current of the point A or the point B, and a voltage sensor also needs to be added to measure an absolute value of a voltage of the point A or the point B.

The second current value and the first voltage value may be determined based on an actual case. This is not specifically limited in this embodiment of this application.

This embodiment describes the apparatus shown in FIG. 21 as an example. It may be understood that, for the apparatuses provided in Apparatus Embodiments 1 to 10, the solution provided in this embodiment may also be used, and details are not described again in this embodiment.

According to the protection apparatus provided in this embodiment of this application, not only a photovoltaic unit and a line can be protected when a short-circuit fault occurs in the photovoltaic unit or the line in which the photovoltaic unit is located, but also a short-circuit current can be cut off in a timely manner when the positive electrode and the negative electrode are short circuited or the direct current bus is short circuited inside the protection apparatus or the direct current bus in the next circuit is short circuited, so that a circuit is protected.

Apparatus Embodiment 12

The foregoing describes an example in which a short-circuit fault is detected by using a reverse current value. The following describes a principle of implementing fault detection by using another parameter detection value.

Further, refer to FIG. 6. A controller is specifically configured to: when a parameter detection value of a branch exceeds a first preset parameter value range, or when a parameter detection value of a direct current bus exceeds a second preset parameter value range, determine that a photovoltaic power generation system is faulty. The parameter detection value may be at least one of a voltage value, a current value, a power value, or a temperature value.

When the parameter detection value is abnormal, for example, a voltage of a branch decreases, a current of a branch increases, power of a branch increases, and a temperature of a branch increases, it may be determined that a short-circuit fault occurs in the branch. The first preset parameter value range and the second preset parameter value range are not specifically limited in this embodiment of this application. The range may be pre-calibrated and stored in the controller, and is invoked when the range is to be used.

In some embodiments, when a leakage current detection value of the direct current bus is greater than a third current value, or when a leakage current detection value of a branch is greater than a fourth current value, the controller determines that the photovoltaic power generation system is faulty.

When a leakage current detection value is abnormal, it indicates that a leakage current fault occurs in the photovoltaic power generation system. According to a solution of this application, the leakage current fault may be located to determine a branch in which the leakage current fault occurs, or the leakage current fault may be located at the direct current bus. In some embodiments, the controller is specifically configured to: when determining, based on current detection values of all branches, that an arc fault occurs in a branch or determining, based on a current detection value of the direct current bus, that an arc fault occurs in the direct current bus, determine that the photovoltaic power generation system is faulty. The controller may specifically determine, based on an offset degree of a current detection value relative to a preset standard value, whether an arc fault occurs.

The controller is further configured to control, according to a control instruction sent by a host computer, a protection switch to be open or closed, to implement active control of the protection switch.

The protection switch in this embodiment of this application and the foregoing embodiments may be a rotary direct current switch disconnector or direct current circuit breaker. The controller is further configured to: after a preset time elapses when it is determined that a fault is rectified, control the protection switch to be closed.

According to the protection apparatus for the photovoltaic power generation system provided in this embodiment of this application, a photovoltaic unit and a line can be effectively protected when the photovoltaic power generation system is faulty, thereby improving safety of the photovoltaic power generation system.

Method Embodiment

An embodiment of this application further provides a protection method for a photovoltaic power generation system. The method is used to control the protection apparatus provided in the foregoing embodiments, and the method may be performed by a controller of the protection apparatus.

In the method, when it is determined, based on a parameter detection value of a branch or a parameter detection value of a direct current bus, that the photovoltaic power generation system is faulty, a protection switch is controlled to be open.

Specifically, the parameter detection value is a reverse current value, and the determining, based on a parameter detection value of a branch or a parameter detection value of a direct current bus, that the photovoltaic power generation system is faulty specifically includes:

when a reverse current value of a branch is greater than a first current value, determining that the photovoltaic power generation system is faulty.

Details are described below.

Figure 22:
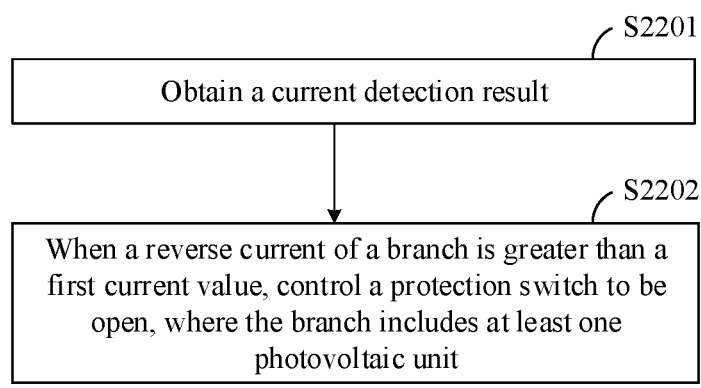
FIG. 22 is a flowchart of a short circuit protection method according to an embodiment of this application.

FIG. 22 is a flowchart of a short circuit protection method according to an embodiment of this application.

The method includes the following steps.

S2201: Obtain a current detection result.

S2202: When a reverse current of a branch is greater than a first current value, control a protection switch to be open, where the branch includes at least one photovoltaic unit.

The following describes a principle of implementing a protection function.

When there is no short-circuit fault, currents of all branches are aggregated into a direct current bus. Therefore, an absolute value of a current of the direct current bus is greater than an absolute value of a current of any branch. A current direction is flowing from a positive electrode of a photovoltaic unit to a positive direct current bus. When a short-circuit fault occurs in any branch, output currents of all other normal branches flow to the branch in which a short-circuit fault occurs. In this case, a voltage of the direct current bus decreases, and a current direction of a branch flows to the branch in which a short-circuit fault occurs, in other words, a reverse current of a branch is greater than the first current value. The first current value may be determined based on an actual case. This is not specifically limited in this embodiment of this application. Preferably, to find a short-circuit fault and trigger a protection action of the protection switch as early as possible, the first current value may be a relatively small value, for example, 0. In other words, when a reverse current occurs in a branch, the protection switch is controlled to be open to protect a photovoltaic unit and a line.

Specifically, the protection function may be implemented by using an absolute value of a detection current or a direction of a detection current. The following provides description in detail.

The following describes a principle of implementing the protection function by using an absolute value of a detection current.

When there is no short-circuit fault, currents of all branches are aggregated into the direct current bus, and therefore the absolute value of the current of the direct current bus is greater than an absolute value of a current of any branch. When a short-circuit fault occurs in any branch, output currents of all other normal branches flow to the branch in which a short-circuit fault occurs. In this case, no current flows to the direct current bus, in other words, the absolute value of the current of the direct current bus is less than an absolute value of a current of any branch.

Therefore, when the absolute value of the current of the direct current bus is less than an absolute value of a current of a branch, the protection switch is controlled to be open, so that a current of any branch is less than the first current value.

The following describes a principle of implementing the protection function by using a direction of a detection current.

A first detection point G is selected from any branch, and positive output ends of all branches other than a branch in which the point G is located are aggregated at a second detection point H, or negative output ends of all branches other than a branch in which the point G is located are aggregated at a second detection point H.

When there is no short-circuit fault, current directions of the detection points G and H may be set to a preset direction, for example, may be set to a positive direction.

When a short-circuit fault occurs in the branch in which the point G is located, currents of all other branches flow to the branch in which the point G is located, and in this case, the current detection direction of the point G is opposite to the preset direction. When the branch in which the point G is located is normal and a short-circuit fault occurs in another branch, the branch in which the point G is located outputs a current to the branch in which a short-circuit fault occurs, and in this case, the current detection direction of the point H is opposite to the preset current direction. Therefore, when the current detection direction of the point G or the point H is opposite to the preset direction, it is determined that a short-circuit fault occurs, and the protection switch is controlled to be open, so that a current of any branch is less than the first current value, thereby protecting a photovoltaic unit and a line.

According to the method provided in this embodiment of this application, when the method is applied to the protection apparatus, when a reverse current of a branch is greater than the first current value, the protection switch is controlled to be open. Specifically, when an absolute value of a current of a branch is greater than the absolute value of the current of the direct current bus, or a current direction of a branch is opposite to a preset current direction, the protection switch is controlled to be open, so that a current of any branch is less than the first current value, thereby protecting a photovoltaic unit and a line.

Further, refer FIG. 21. In some embodiments, the apparatus further includes a power circuit, and the direct current bus is connected to an input end of the power circuit via a direct current switch. In this case, an embodiment of this application further provides another apparatus control method, used to protect a circuit when a positive electrode and a negative electrode are short circuited inside the apparatus or a next-circuit bus is short circuited. The following provides detailed description.

Figure 23:
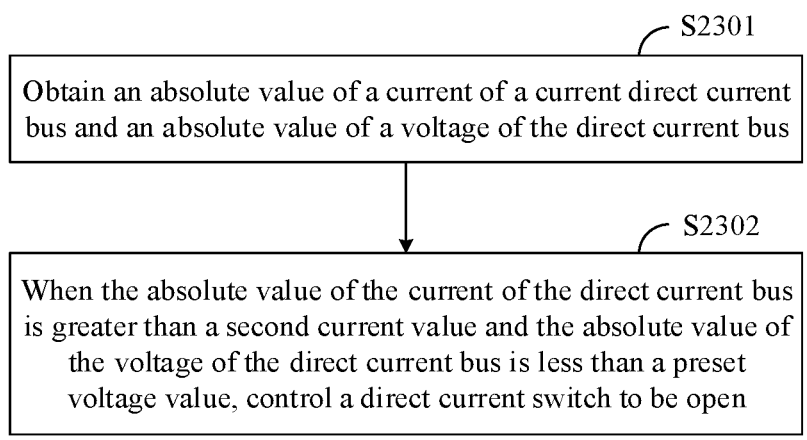
FIG. 23 is a flowchart of another short circuit protection method according to an embodiment of this application.

FIG. 23 is a flowchart of another short circuit protection method according to an embodiment of this application.

The method includes the following steps.

S2301: Obtain an absolute value of a current of a current direct current bus and an absolute value of a voltage of the direct current bus.

S2302: When the absolute value of the current of the direct current bus is greater than a second current value and the absolute value of the voltage of the direct current bus is less than a first voltage value, control a direct current switch to be open.

When a positive electrode and a negative electrode are short circuited inside a protection apparatus or a direct current bus in a next circuit is short circuited, in other words, short-circuiting occurs between a positive direct current bus and a negative direct current bus in which a point A and a point B are located, a voltage of the direct current bus decreases, and a current of the direct current bus increases. Therefore, the point A or the point B may be used as a detection point. When an absolute value of a voltage of the detection point is less than the first voltage value and an absolute value of a current of the detection point is greater than the second current value, a controller controls the direct current switch to be open to cut off a short-circuit current.

The second current value and the first voltage value may be determined based on an actual case. This is not specifically limited in this embodiment of this application.

According to the method, a short-circuit current can be cut off in a timely manner when the positive electrode and the negative electrode are short circuited inside the protection apparatus and the next-circuit bus is short circuited, so that the apparatus and the next circuit are protected.

The following describes a method for determining a fault by using another parameter detection value.

When the parameter detection value is at least one of a voltage value, a current value, a power value, or a temperature value, the determining, based on a parameter detection value of a branch or a parameter detection value of a direct current bus, that a photovoltaic power generation system is faulty specifically includes:

when the parameter detection value of the branch exceeds a first preset parameter value range, or when the parameter detection value of the direct current bus exceeds a second preset parameter value range, determining that the photovoltaic power generation system is faulty.

During leakage current fault determining, the determining, based on a parameter detection value of a branch or a parameter detection value of a direct current bus, that a photovoltaic power generation system is faulty specifically includes:

when a leakage current detection value of the direct current bus is greater than a third current value, or when a leakage current detection value of the branch is greater than a fourth current value, determining that the photovoltaic power generation system is faulty.

During arc fault determining, the determining, based on a parameter detection value of a branch or a parameter detection value of a direct current bus, that a photovoltaic power generation system is faulty specifically includes:

when determining, based on current detection values of all branches, that an arc fault occurs in a branch or determining, based on a current detection value of the direct current bus, that an arc fault occurs in the direct current bus, determining that the photovoltaic power generation system is faulty.

According to the protection method for the photovoltaic power generation system provided in this embodiment of this application, a photovoltaic unit and a line can be effectively protected when the photovoltaic power generation system is faulty, thereby improving safety of the photovoltaic power generation system.

Photovoltaic Power Generation System Embodiment

Based on the protection apparatus that is applied to the photovoltaic power generation system and that is provided in the foregoing embodiments, an embodiment of this application further provides a photovoltaic power generation system. The following provides detailed description with reference to the accompanying drawings.

Figure 24:
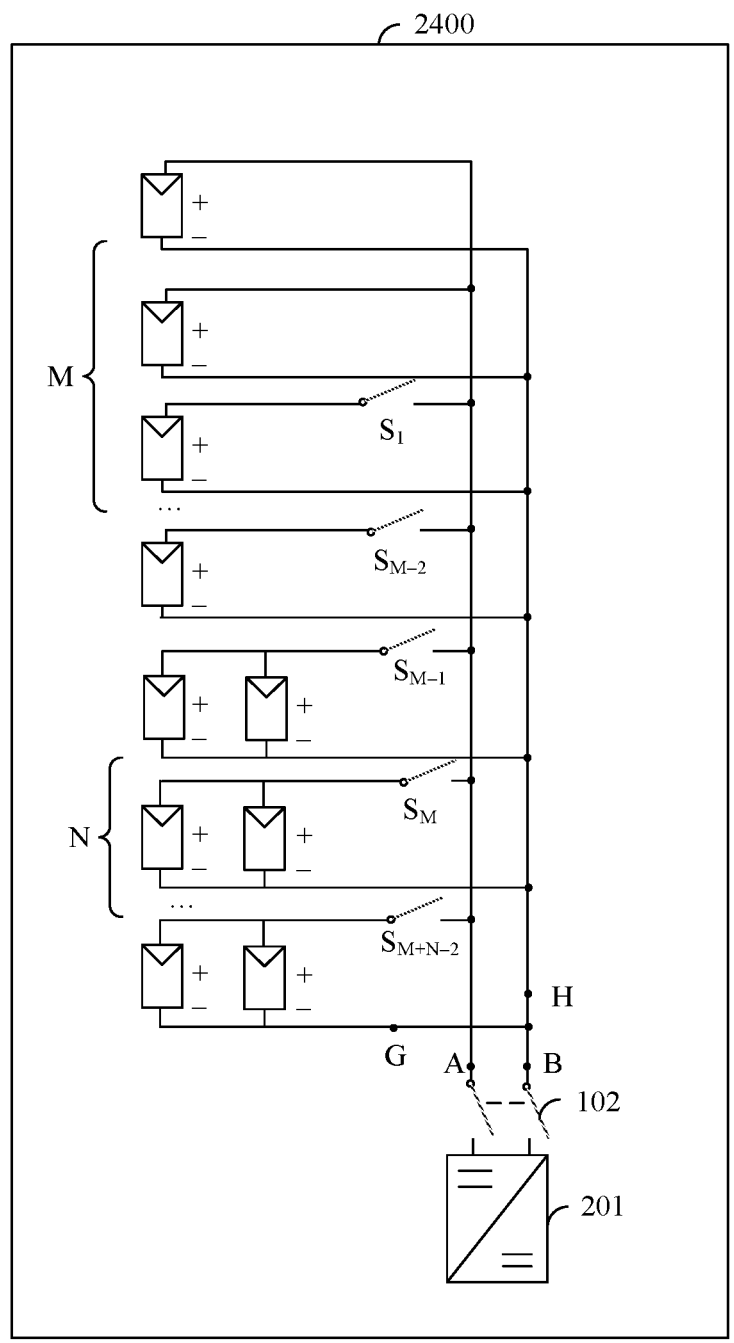
FIG. 24 is a schematic diagram of a photovoltaic power generation system according to an embodiment of this application.

FIG. 24 is a schematic diagram of a photovoltaic power generation system according to an embodiment of this application.

The photovoltaic power generation system 2400 includes at least two photovoltaic units and a protection apparatus.

The photovoltaic unit is formed by connecting at least one photovoltaic component in series or in parallel.

The protection apparatus may be connected to at least two photovoltaic units via an interface, the at least two photovoltaic units are connected to a direct current bus in parallel inside the apparatus to form at least two branches, and each branch is connected to at least one photovoltaic unit.

A protection switch of the protection apparatus is configured to: when being open, enable a maximum of three photovoltaic units to directly connect to the direct current bus in parallel inside the apparatus.

The protection apparatus further includes a controller. For description of the controller, refer to the foregoing embodiments. Details are not described again in this embodiment.

Further, the protection apparatus may further include a power circuit 201, and the power circuit 201 is configured to perform power conversion.

In some embodiments, the power circuit 201 may be a direct current/direct current (DC/DC) conversion circuit. When the power circuit 201 is a direct current/direct current conversion circuit, the direct current/direct current conversion circuit may be specifically a boost (Boost) circuit, a buck (Buck) circuit, or a buck-boost (Buck-Boost) circuit. This is not specifically limited in this application.

In some embodiments, the power circuit 201 may be a direct current/alternating current (DC/AC) conversion circuit, namely, an inverter (or referred to as an inverter circuit), configured to convert a direct current into an alternating current for output.

This embodiment describes the apparatus shown in FIG. 20 as an example. It may be understood that, for the apparatuses provided in Apparatus Embodiments 1 to 11, the solution provided in this embodiment may also be used, and details are not described again in this embodiment.

According to the photovoltaic power generation system provided in this embodiment of this application, when the protection apparatus for the photovoltaic power generation system is connected to a plurality of photovoltaic units via the interface, when a reverse current of a branch is greater than a first current value, the controller can control the protection switch to be open. Specifically, when an absolute value of a current of any branch is greater than an absolute value of a current of the direct current bus or a current direction of any branch is opposite to a preset current direction, the controller controls the protection switch to be open, so that a current of any branch is less than the first current value, thereby protecting a photovoltaic unit and a line in the photovoltaic system. In addition, because only the protection switch is added to a circuit, and the protection switch has a smaller resistance than a fuse, a loss rate and a loss of the photovoltaic system are further reduced. In addition, because the fuse is no longer used, a Y harness originally used for the built-in fuse may be disposed on a photovoltaic unit side instead of being disposed below an inverter or a direct current combiner box of the photovoltaic power generation system, so that cable costs of the photovoltaic power generation system are further reduced.

The controller in this embodiment of this application may be an application-specific integrated circuit (ASIC), a programmable logic device (PLD), or a combination thereof. The PLD may be a complex programmable logic device (CPLD), a field-programmable gate array (FPGA), generic array logic (GAL), or any combination thereof. This is not specifically limited in this embodiment of this application.

It should be understood that, in this application, "at least one (item)" means one or more, and "a plurality of" means two or more. The term "and/or" is used to describe an association relationship between associated objects, and indicates that three relationships may exist. For example, "A and/or B" may represent the following three cases: Only A exists, only B exists, and both A and B exist, where A and B may be singular or plural. The character "/" usually represents an "or" relationship between the associated objects. "At least one of the following items (pieces)" or a similar expression thereof indicates any combination of these items, including a single item (piece) or any combination of a plurality of items (pieces). For example, at least one of a, b, or c may indicate a, b, c, "a and b", "a and c", "b and c", or "a, b, and c", where a, b, and c may be singular or plural.

The foregoing embodiments are merely intended for describing exemplary technical solutions of this application, but not for limiting this application. Although this application is described in detail with reference to the foregoing embodiments, persons of ordinary skill in the art should understand that they may still make modifications to technical solutions described in the foregoing embodiments or make equivalent replacements to some technical features thereof. These modifications or replacements do not depart from the spirit and the scope of technical solutions of embodiments of this application.

What is claimed is:

1. A photovoltaic power generation system, wherein the photovoltaic power generation system comprises:
a protection apparatus;
a power circuit; and
a plurality of photovoltaic units;
wherein the protection apparatus comprises a direct current bus, a controller, a plurality of protection switches, and a plurality of interfaces;
wherein the protection apparatus is connected to the plurality of photovoltaic units via the plurality of interfaces, the plurality of photovoltaic units are coupled to the direct current bus inside the protection apparatus to form at least one branch, and each branch of the at least one branch is connected to at least two photovoltaic units connected in parallel;
wherein the power circuit is a direct current-direct current (DC-DC) conversion circuit or a direct current-alternating current (DC-AC) conversion circuit, and the power circuit is connected to the direct current bus; and
wherein the controller is configured to:
detect, based on a parameter detection value of the at least one branch or a parameter detection value of the direct current bus, that the photovoltaic power generation system is faulty; and
based on having detected that the photovoltaic power generation system is faulty, control the plurality of protection switches to disconnect at least some of the plurality of photovoltaic units from the direct current bus, to reduce a quantity of photovoltaic units connected in parallel, so that a maximum of three of the plurality of photovoltaic units are connected in parallel.

2. The photovoltaic power generation system according to claim 1, wherein the parameter detection value is a reverse current value of the at least one branch; and
wherein detecting that the photovoltaic power generation system is faulty is based on the reverse current value of the at least one branch being greater than a first current value.

3. The photovoltaic power generation system according to claim 2, wherein a respective photovoltaic unit of the plurality of photovoltaic units is connected to one protection switch in series, and the protection switch is connected to a positive output end or a negative output end of the respective photovoltaic unit in series.

4. The photovoltaic power generation system according to claim 2, wherein the plurality of photovoltaic units are connected to multiple protection switches in series, wherein two or more protection switches are respectively connected to a-positive output ends or negative output ends of the plurality of photovoltaic units in series, and wherein opposite ends of the plurality of photovoltaic units are connected together to another single protection switch.

5. The photovoltaic power generation system according to claim 2, wherein the controller is configured to: determine that the reverse current of the at least one branch is greater than the first current value based on an absolute value of a current of the at least one branch being greater than an absolute value of a current of the direct current bus.

6. The photovoltaic power generation system according to claim 5, wherein the protection apparatus further comprises a first current sensor and a second current sensor;
wherein the first current sensor is configured to: obtain the absolute value of the current of the direct current bus, and send the absolute value to the controller; and
wherein the second current sensor is configured to: obtain a preset absolute value of a current of a respective branch, and send the absolute value to the controller.

7. The photovoltaic power generation system according to claim 6, wherein the protection apparatus further comprises a first voltage sensor and a direct current switch;
wherein the direct current bus is connected to an input end of the power circuit via the direct current switch; and
wherein the first voltage sensor is configured to: obtain an absolute value of a voltage of the direct current bus, and send the absolute value to the controller.

8. The photovoltaic power generation system according to claim 2, wherein the controller is configured to: determine that the reverse current of the at least one branch is greater than the first current value based on a current direction of the at least one branch being opposite to a preset current direction.

9. The photovoltaic power generation system according to claim 8, wherein the apparatus further comprises a third current sensor and a fourth current sensor;
wherein the third current sensor is configured to: obtain a current detection direction of a first detection point, and send the current detection direction to the controller, wherein the first detection point is located in a respective branch of the at least one branch; and
wherein the fourth current sensor is configured to: obtain a current detection direction of a second detection point, and send the current detection direction to the controller, wherein all branches other than the respective branch in which the first detection point is located are aggregated at the second detection point.

10. The photovoltaic power generation system according to claim 9, wherein the controller is configured to: control a respective protection switch to be open based on the current detection direction of the first detection point being opposite to a preset current direction of the first detection point or the current detection direction of the second detection point being opposite to a preset current direction of the second detection point.

11. The photovoltaic power generation system according to claim 10, wherein the protection apparatus further comprises a fifth current sensor, a second voltage sensor, and a direct current switch;
wherein the direct current bus is connected to an input end of the power circuit via the direct current switch;
wherein the fifth current sensor is configured to: obtain an absolute value of a current of the direct current bus, and send the absolute value to the controller; and
wherein the second voltage sensor is configured to: obtain an absolute value of a voltage of the direct current bus, and send the absolute value to the controller.

12. The photovoltaic power generation system according to claim 11, wherein the controller is further configured to: control the direct current switch to be open based on the absolute value of the current of the direct current bus being greater than a second current value and the absolute value of the voltage of the direct current bus being less than a first voltage value.

13. The photovoltaic power generation system according to claim 1, wherein the plurality of photovoltaic units are first connected in parallel and connected to two or three protection switch in series; and
wherein positive output ends of the plurality of photovoltaic units are connected in parallel and then connected to one protection switch in series, and negative output ends of the plurality of photovoltaic units are connected in parallel and then connected to another one or two protection switches in series.

14. The photovoltaic power generation system according to claim 1, wherein the plurality of photovoltaic units are first connected in parallel and then connected to two protection switches in series;
wherein positive output ends of the plurality of photovoltaic units are connected in parallel and then connected to one protection switch of the two protection switches in series, and negative output ends of the plurality of photovoltaic units are connected in parallel and part of the plurality of photovoltaic units are then connected to the other protection switch of the two protection switches in series.

15. The photovoltaic power generation system according to claim 1, wherein determining that the photovoltaic power generation system is faulty is based on the parameter detection value of the at least one branch exceeding a preset parameter value range.

16. The photovoltaic power generation system according to claim 15, wherein the parameter detection value is at least one of the following:
a voltage value, a current value, a power value, or a temperature value.

17. The photovoltaic power generation system according to claim 1, wherein determining that the photovoltaic power generation system is faulty is based on a leakage current detection value of the direct current bus being greater than a third current value or a leakage current detection value of the at least one branch being greater than a fourth current value.

18. The photovoltaic power generation system according to claim 1, wherein determining that the photovoltaic power generation system is faulty is based on determining, based on current detection values of all the branches, that an arc fault occurs in a branch or determining, based on a current detection value of the direct current bus, that an arc fault occurs in the direct current bus.

19. The photovoltaic power generation system according to claim 1, wherein the controller is further configured to: based on determining that an arc fault has occurred in a respective branch, control a respective protection switch of the plurality of protection switches to disconnect the faulty branch from the direct current bus, or control all of the plurality of protection switches to be open.

20. The photovoltaic power generation system according to claim 1, wherein the controller is further configured to control, according to a control instruction from a host, a respective protection switch of the plurality of protection switches to be open or closed.

21. The photovoltaic power generation system according to claim 1, wherein a maximum of three photovoltaic units are directly connected in parallel and then connected to one interface, or a maximum of three photovoltaic units are connected in parallel inside the protection apparatus via corresponding interfaces.

22. The photovoltaic power generation system according to claim 1, wherein a respective photovoltaic unit and a protection unit are connected in series or in parallel and then connected to the protection apparatus via an interface, and a respective protection switch is further configured to: prevent the protection unit from triggering a protection action based on the respective protection switch being open.

23. The photovoltaic power generation system according to claim 22, wherein the protection unit comprises at least one of the following:
a fuse, an optimizer, or a disconnection box.

24. The photovoltaic power generation system according to claim 1, wherein a respective protection switch is a rotary direct current switch disconnector or a direct current circuit breaker, and each branch of the at least one branch is connected to the direct current bus via the rotary direct current switch disconnector or the direct current circuit breaker; and
wherein the controller is configured to: based on the photovoltaic power generation system being faulty, control the rotary direct current switch disconnector and/or the direct current circuit breaker to be disconnected so that less than three photovoltaic units are connected in parallel or connected to the direct current bus in each branch of the at least one branch.

25. The photovoltaic power generation system according to claim 24, wherein the controller is further configured to control the protection switch to be closed after it is determined that the fault is rectified or after a preset time.

26. The photovoltaic power generation system according to claim 1, wherein the protection apparatus further comprises a power converter, and at least some of the plurality of photovoltaic units are coupled to the direct current bus via the power converter.

27. A protection method for a photovoltaic power generation system, applied to the photovoltaic power generation system,
wherein the photovoltaic power generation system comprises a protection apparatus for the photovoltaic power generation system, a power circuit, and a plurality of photovoltaic units,
wherein the protection apparatus comprises a direct current bus, a controller, a plurality of protection switches, and a plurality of interfaces,
wherein the protection apparatus is connected to the plurality of photovoltaic units via the plurality of interfaces,
wherein the plurality of photovoltaic units are coupled to the direct current bus inside the protection apparatus to form at least one branch,
wherein each branch of the at least one branch is connected to at least two photovoltaic units connected in parallel,
wherein the power circuit is a direct current-direct current (DC-DC) conversion circuit or a direct current-alternating current (DC-AC) conversion circuit,
wherein the power circuit is connected to the direct current bus, and wherein the protection method comprises:
detecting, based on a parameter detection value of the at least one branch or a parameter detection value of the direct current bus, that the photovoltaic power generation system is faulty; and
based on having detected that the photovoltaic power generation system is faulty, controlling at least some of the plurality of protection switches to be disconnected, to reduce a quantity of photovoltaic units connected in parallel, so that a maximum of two or three of the plurality of photovoltaic units are connected in parallel.

28. The protection method according to claim 27, wherein a respective protection switch is a rotary direct current switch disconnector or a direct current circuit breaker;
wherein the parameter detection value of the at least one branch is a reverse current value of the at least one branch;
wherein determining that the photovoltaic power generation system is based on the reverse current value of the at least one branch being greater than a first current value; and
wherein controlling at least some of the plurality of protection switches to be disconnected comprises controlling at least some of the plurality of protection switches to be disconnected so that less than three photovoltaic units are connected in parallel or connected to the direct current bus in each branch of the at least one branch.

29. The protection method according to claim 27, wherein a respective protection switch is a rotary direct current switch disconnector or a direct current circuit breaker;
wherein the direct current bus is connected to an input end of the power circuit via a direct current switch; and
wherein the method further comprises: controlling, based on an absolute value of a current of the direct current bus being greater than a second current value and an absolute value of a voltage of the direct current bus being less than a first voltage value, at least some of the plurality of protection switches to be disconnected so that no or less than three photovoltaic units are connected in parallel or connected to the direct current bus in each branch of the at least one branch.

30. The protection method according to claim 22, wherein the parameter detection value is at least one of a voltage value, a current value, a power value, or a temperature value; and
wherein determining that the photovoltaic power generation system is faulty is based on the parameter detection value of the at least one branch exceeding a preset parameter value range.

31. The protection method according to claim 30, wherein determining that the photovoltaic power generation system is faulty is based on a leakage current detection value of the direct current bus being greater than a third current value or a leakage current detection value of the at least one branch being greater than a fourth current value.

32. The protection method according to claim 27, wherein determining that the photovoltaic power generation system is faulty is based on determining, based on current detection values of all branches of the at least one branch, that an arc fault has occurred in a respective branch or determining, based on a current detection value of the direct current bus, that an arc fault has occurred in the direct current bus.

33. A protection apparatus for a photovoltaic power generation system, comprising:
a plurality of protection switches;
a direct current busy configured to separately connect to a plurality of photovoltaic units via the plurality of protection switches, wherein the plurality of photovoltaic units are connected in parallel to at least one branch of the direct current bus, and each branch of the at least one branch is connected to at least two photovoltaic units connected in parallel;
a power circuit, wherein the power circuit is a direct current-direct current (DC-DC) conversion circuit or a direct current-alternating current (DC-AC) conversion circuit, and the power circuit is configured to connect to the direct current bus; and
a controller configured to:
detect, based on a parameter detection value of the at least one branch or a parameter detection value of the direct current bus, that the photovoltaic power generation system is faulty; and
based on having detected that the photovoltaic power generation system is faulty, control the plurality of protection switches to disconnect at least some of the plurality of photovoltaic units from the direct current bus, to reduce a quantity of photovoltaic units connected in parallel, so that a maximum of three of the plurality of photovoltaic units are connected in parallel.

* * * * *

UNITED STATES PATENT AND TRADEMARK OFFICE
CERTIFICATE OF CORRECTION

PATENT NO. : 11,870,238 B2
APPLICATION NO. : 17/535375
DATED : January 9, 2024
INVENTOR(S) : Zhang et al.

It is certified that error appears in the above-identified patent and that said Letters Patent is hereby corrected as shown below:

In the Claims

Claim 4: Column 39, Line 3: "to a-positive output ends or negative output ends of the" should read -- to positive output ends or negative output ends of the --.

Claim 13: Column 40, Line 14: "first connected in parallel and connected to two or three" should read -- connected in parallel and connected to two or three --.

Claim 33: Column 43, Line 4: "a direct current busy configured to separately connect to" should read -- a direct current bus configured to separately connect to --.

Signed and Sealed this
Thirtieth Day of April, 2024

*Katherine Kelly Vidal*

Katherine Kelly Vidal
*Director of the United States Patent and Trademark Office*